United States Patent [19]

Coffee et al.

[11] Patent Number: 4,580,721
[45] Date of Patent: Apr. 8, 1986

[54] FLUID CONTAINER

[75] Inventors: Ronald A. Coffee, Haslemere; Peter C. Bennett, Churt; Leonard E. Houghton, Petworth; Graham C. Johnson, Hindhead, all of England

[73] Assignee: Imperial Chemical Industries PLC, London, England

[21] Appl. No.: 463,952

[22] Filed: Feb. 4, 1983

Related U.S. Application Data

[63] Continuation-in-part of Ser. No. 348,087, Feb. 11, 1982, Pat. No. 4,467,961.

[30] Foreign Application Priority Data

Feb. 12, 1981 [GB] United Kingdom ................ 8104314
Apr. 3, 1981 [GB] United Kingdom ................ 8110543
Feb. 5, 1982 [GB] United Kingdom ................ 8203420

[51] Int. Cl.$^4$ ................... A01M 7/00; B05B 5/02
[52] U.S. Cl. .................................. 239/3; 222/23; 222/66; 239/69; 239/74; 239/172; 239/302; 239/303; 239/690
[58] Field of Search ............... 340/825.34, 825.35; 222/23, 52, 65, 66, 129.3; 239/3, 69, 71, 74, 155–158, 170, 172, 690, 691, 600, 159, 112, 302, 303

[56] References Cited

U.S. PATENT DOCUMENTS 3,920,149  11/1975  Fortino et al. ............. 222/129.3 X
4,006,396   2/1977  Bogut .
4,023,020   5/1977  Lestradet ................. 239/155 X
4,275,846   6/1981  Coffee .
4,364,472  12/1982  Waldmeier .............. 340/825.34 X

FOREIGN PATENT DOCUMENTS 0025280  3/1981  European Pat. Off. .
0058472  6/1982  European Pat. Off. .
2550930  5/1977  Fed. Rep. of Germany .
1569707  6/1980  United Kingdom .
2039202  6/1980  United Kingdom .
2073052 10/1981  United Kingdom .

Primary Examiner—Andres Kashnikow
Attorney, Agent, or Firm—Cushman, Darby & Cushman

[57] ABSTRACT

A container having attached to it at least one memory device carrying information relating to the intended contents of the container; the device being operably connectable to apparatus responsive to information communicated from the memory device whereby an operation actively involving the contents of the container may be performed in a manner at least partly determined by the characteristics of the contents.

54 Claims, 21 Drawing Figures

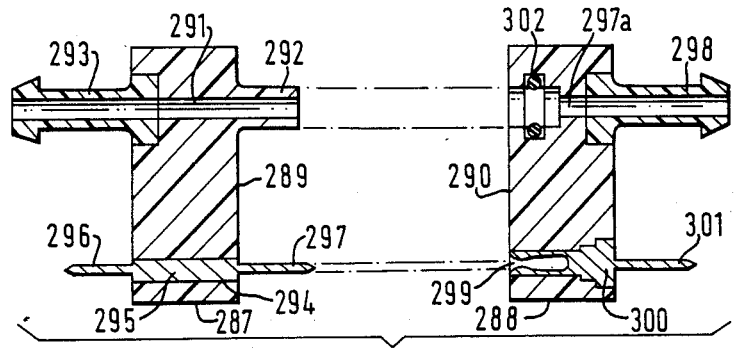
FIG. 11
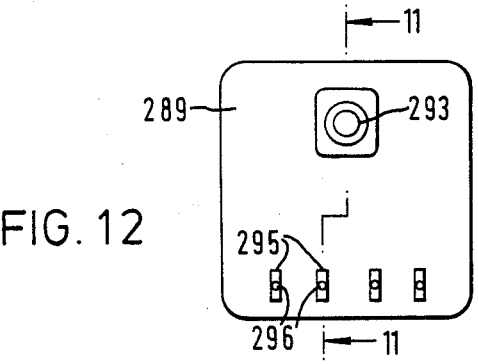
FIG. 12
FIG. 13
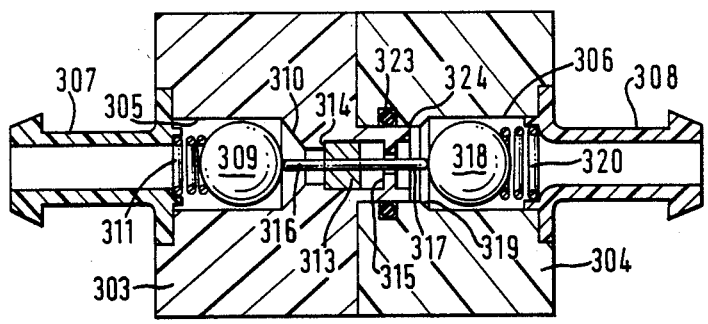

FLUID CONTAINER

This application is a continuation-in-part of our earlier filed copending commonly assigned application Ser. No. 348,087, filed Feb. 11, 1982, now U.S. Pat. No. 4,467,961. This application also related to the following copending commonly assigned applications for other inventive entities:
Ser. No. 463,938 filed Feb. 4, 1983
Ser. No. 463,939 filed Feb. 4, 1983
Ser. No. 463,940 filed Feb. 4, 1983
Ser. No. 463,941 filed Feb. 4, 1983
Ser. No. 463,942 filed Feb. 4, 1983
Ser. No. 463,943 filed Feb. 4, 1983
(Ser. Nos. 436,942 and 463,943, now abandoned in favor of Ser. No. 463,938, now U.S. Pat. No. 4,553,702, and Ser. Nos. 463,939 and 463,940, now abandoned in favor of Ser. No. 463,941.)

This application is also related to copending applications Ser. No. 463,892 and Ser. No. 463,893 both filed Feb. 4, 1983 and assigned to the Plessey Company PLC (Plessey cases 1403 and 1444). Application Ser. No. 463,893 has been abandoned in favor of file wrapper continuation Ser. No. 766,674, filed Aug. 16, 1985.

The invention described and claimed in this and the above-referenced copending applications are related to a common collaborative development effort.

This invention relates to containers for contents to be subjected to an operation which relates to the nature of those contents. It is especially but not exclusively concerned with containers for fluids which are to be dispensed or otherwise processed and is useful in particular in the spraying of fluids such as agricultural chemicals.

It is frequently desirable to keep exposure and handling of the contents of containers to a minimum in order to protect the evironment from the contents as in the case of toxic substances or vice versa as in the case of medical or nutritional substances or to reduce the risk of incorrect handling. One example is the spraying of agricultural chemicals.

In nearly every country of the world, agricultural spraying of land or crops is widely carried out, frequently from a vehicle such as a tractor or an aircraft. Spraying is carried out using an active ingredient (e.g. a pesticide or herbicide) dissolved or disposed in a diluent (e.g. oil or water). Thus, a tractor may carry a spraytank filled with water, into which a concentrated liquid or powder formulation of the active ingredient is poured and mixed prior to spraying.

This arrangement has drawbacks. The active spray ingredients are frequently toxic to man to a greater or lesser extent, particularly in concentrated form. Thus, in some cases, emptying a concentrated pesticide formulation into a spraytank can represent a hazard, in particular to unskilled or poorly trained operators. It is also possible for such operators to make mistakes in the dilution procedure, by putting in either too little active ingredient (perhaps in consequence leaving a crop unprotected) or too much (which is wasteful and could damage a crop or the environment).

There is in consequence a need for spraying systems which do not involve dilution of concentrated pesticides by the operator. In such systems, either the pesticide formulation is not diluted at all (as is now sometimes done, for example, in ultra-low volume spraying of insecticides from a rotary atomizer, and as has also been proposed for certain electrostatic spraying systems) or it is diluted automatically e.g. by being metered into a stream of diluent from a diluent storage tank carried on the tractor.

Of course a practical sprayer is required to spray pesticides or herbicides of several different kinds. Some pesticides or herbicides are conveniently formulated in more concentrated form than others, or need to be applied at lower rates. Thus the rate at which liquid flows through the sprayer to the sprayhead generally needs to be controllable. It may of course be controlled manually, by some device or other, but this may sometimes lead to operator error.

In general an agricultural spraying system is desired which simply or automatically protects against improper usage of toxic chemicals by accurately controlling the actual application rate of active ingredients and which is reliable in all environmental conditions. The system should also be economical to provide and operate, be compatible with the introduction of new chemicals and be a modular design which permits a wide range of users to be serviced using the same basic component—and which also permits a given user to expand and upgrade his system and/or to rapidly repair the system by merely replacing elemental modules.

The present invention is especially suited for use in electrostatic agricultural spraying, which has particular advantages. For example, it provides more even coverage of plants with much improved coverage of under-leaf surfaces; reduces drift and contamination of the environment; and often enables lower rates of pesticide to be applied than are effective with uncharged sprays. It may be found, however, best to vary the applied electrostatic voltage according to the nature of the pesticide or herbicide formulation it is desired to apply.

It is an objective of the present invention to provide containers and systems including such containers with enhanced utility in the above and other fields of use.

Accordingly the present invention provides a container having attached to it at least one memory device carrying information relating to the intended contents of the container; the device being operably connectable to operating means including means responsive to information communicated from said memory device whereby an operation actively involving the contents of the container may be performed in a manner at least partly determined by the characteristics of the contents.

The expression memory device as used herein includes electrical and non-electrical devices having some memory capability beyond that displayed by simple variable resistances.

It is conveniently an active memory device including electrical or electronic elements capable of controlling voltages or currents to produce gain or switching action in a circuit e.g. transistors.

Suitable devices include digital memory devices such as are capable of providing a coded digital signal and analog devices especially when used in conjunction with an analog digital converter.

The expression operating means as used herein should be understood broadly to include inter alia means for performing any physical or chemical process to which the intended contents may be subjected e.g. pumping, heating, mixing or electrically charging.

The invention is especially suitable for processes in which the contents are actively involved that is to say processed in some way which is distinguished from (although not necessarily separate from) the container.

The operation may take place inside or outside the container.

The memory device is preferably firmly attached to the container so as to establish a secure association between the device and the contents. The expression attached however should not be interpreted in a narrow sense; it includes any form of connection giving a strong association between the contents and the device as will be readily understood in circumstances where some spacing of the device from the container may be desirable because of severe operating conditions in or in the vicinity of the container.

Further, although in many applications it is desirable that the attachment between the device and the container should be permanent it is possible to envisage applications in which the device and the container are brought together and/or separated at different times.

The means responsive to the information communicated from the memory device is included within the operating means and may take a variety of forms known in the art.

According to a further aspect of the present invention the container may be used in "open-loop" mode in which the operating means comprises a display means such as a VDU permitting a scanning of information concerning the contents and operator intervention. In this aspect the scanning process itself may be considered the operation to be performed upon the contents although this is preferably followed by a subsequent operation involving the contents.

The invention is however especially useful when used in the "closed-loop" mode in which the operation takes place automatically without operator intervention.

The memory device is preferably pre-set e.g. before being operably connected to the operating means.

According to a further aspect of the invention the memory device is pre-set so as to cause the operating means to cease operation when the contents of the container in use reach a predetermined state.

The device may be constructed in such a way (e.g. by using fusible links) as to change irreversibly as the contents of the container are operated on thus preventing unauthorised re-use. Exhaustion of the contents may occur e.g. when the container is emptied of the contents or when the activity of the contents is used up.

The container is conveniently for many uses detachably connectable to the operating means in use whereby the operation may be continued simply by replacing an exhausted container with a fresh one.

The present invention also provides coupling means for coupling a container of the present invention to the operating means.

Containers of the present invention are useful in the dispensing of fluids which may include any substance in a flowable form such as liquids, gases or particulate solids. In such processes the rate at which the fluid is dispensed or some other dispensing parameter such as the voltage applied to the sprayhead in electrostatic spraying may be regulated by the memory device.

Containers of the present invention are especially useful when used in combination with an electronic data processing circuit enabling a more complex variety of operating variables to be regulated according to the characteristics of the contents.

Containers of the present invention are also useful in vehicle-mounted arrangements when various modules of a system including such containers may be mounted on different parts of the vehicle, such as is frequently the case in the spraying of agricultural chemicals.

The present invention also provides systems and complexes including containers of the present invention and processes utilising such containers.

The present invention also provides a system for spraying pesticides or herbicides in which manual dilution (with constant operator hazard and possible dilution errors) is avoided and in which the delivery rate of diluted solution to the spraying nozzles and electrostatic voltages may, (both or either one) if desired, be automatically determined.

The operating means may include flow control apparatus which may take various forms. It may, for example, be a variable valve (for example a mechanical valve, such as a stopcock or iris, operated by an electronic control through an electromagnetic relay). Another suitable type of valve, particularly readily operable by electronic control, is a variable electrostatic valve of the type described in our prior U.S. Pat. No. 4,275,846. One particularly convenient form of flow control apparatus is a metering pump. Such a pump may be electrically driven (e.g. from an electrical power supply on a vehicle), and its speed is then readily controlled by electrical or electronic circuits controlling the power or frequency of the electrical supply to the pump. A metering pump, though more complex than a variable valve, can control liquid delivery more accurately since it does not depend on gravity or relative liquid pressures to propel a predetermined quantity of liquid.

Alternatively a pump operating inside the container such as the ion-pump described in our UK Patent Application No. 8224408 may be used.

Coded signals emmitted by the memory may produce a range of effects. They may simply act as an "on" switch, so that the operation will only take place where the signal received has a predetermined value. The operating means may be designed to provide several different combinations of operating variable corresponding to different values of the presetting of the memory device on the container which are related to the contents of a particular container. The automatic operating mechanism may also be designed to vary voltage, or flow rate, or both, between minimum and maximum values according to corresponding variation in the value of the presetting.

As previously outlined, the pre-set memory device on the container may also control the operating means by providing analog electrical signals of pre-set value. This analog electrical signal may then be used (either directly or indirectly) to operate the operating means, corresponding to the magnitude(s) of the signals(s).

Specific embodiments of the invention will now be described with reference to the accompanying drawings in which:

FIG. 11 is a side sectional view through an electrohydraulic connector useful in the embodiment of FIG. 6;

FIG. 12 is a front view of the socket face of the connector of FIG. 11;

FIG. 13 is a vertical section through a valved hydraulic connector useful in the embodiment of FIG. 6;

Figure 6:
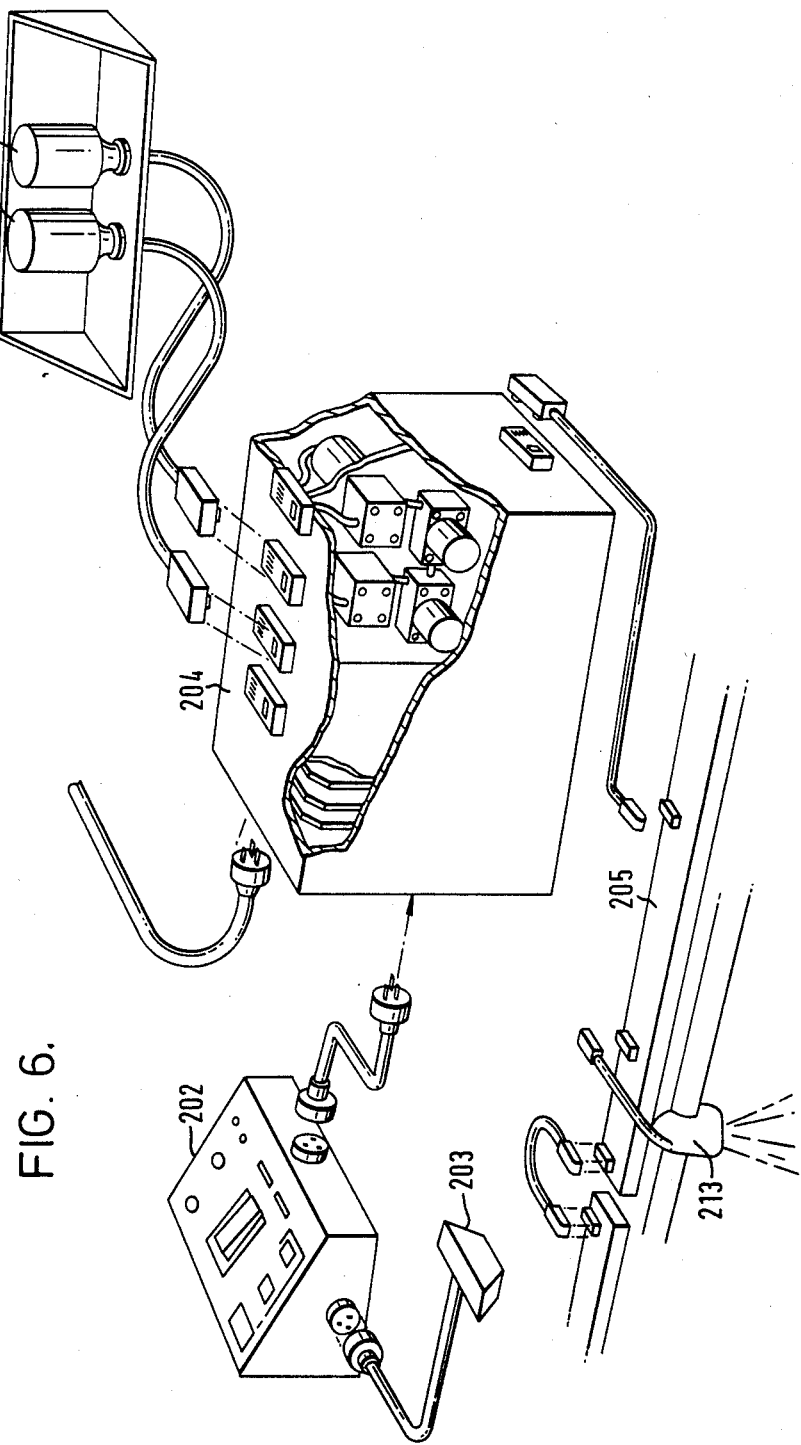
FIG. 6 is a more detailed perspective view of the interconnections between the modules of the invention shown in FIG. 5.
Figures 18, 20:
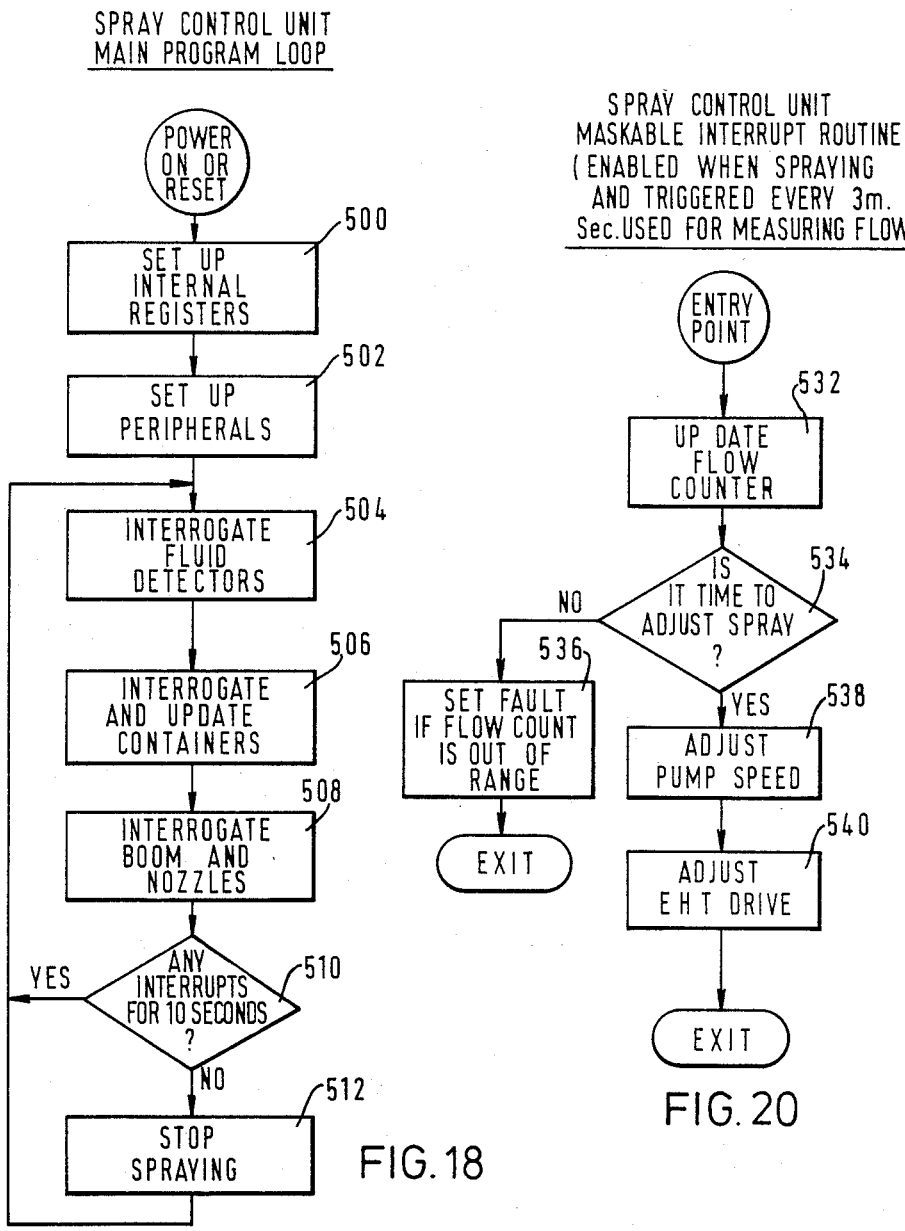
Figure 19:
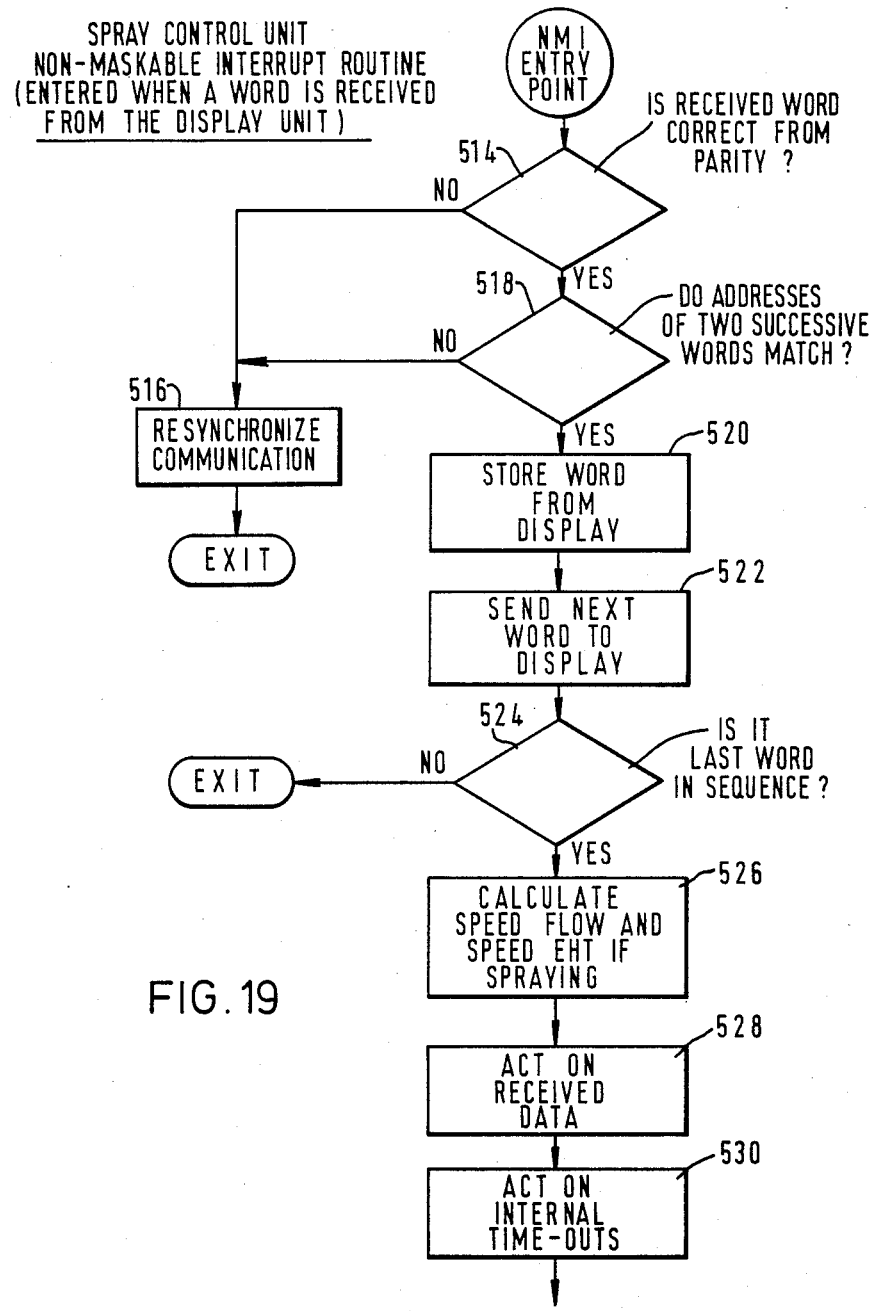
Figure 21:
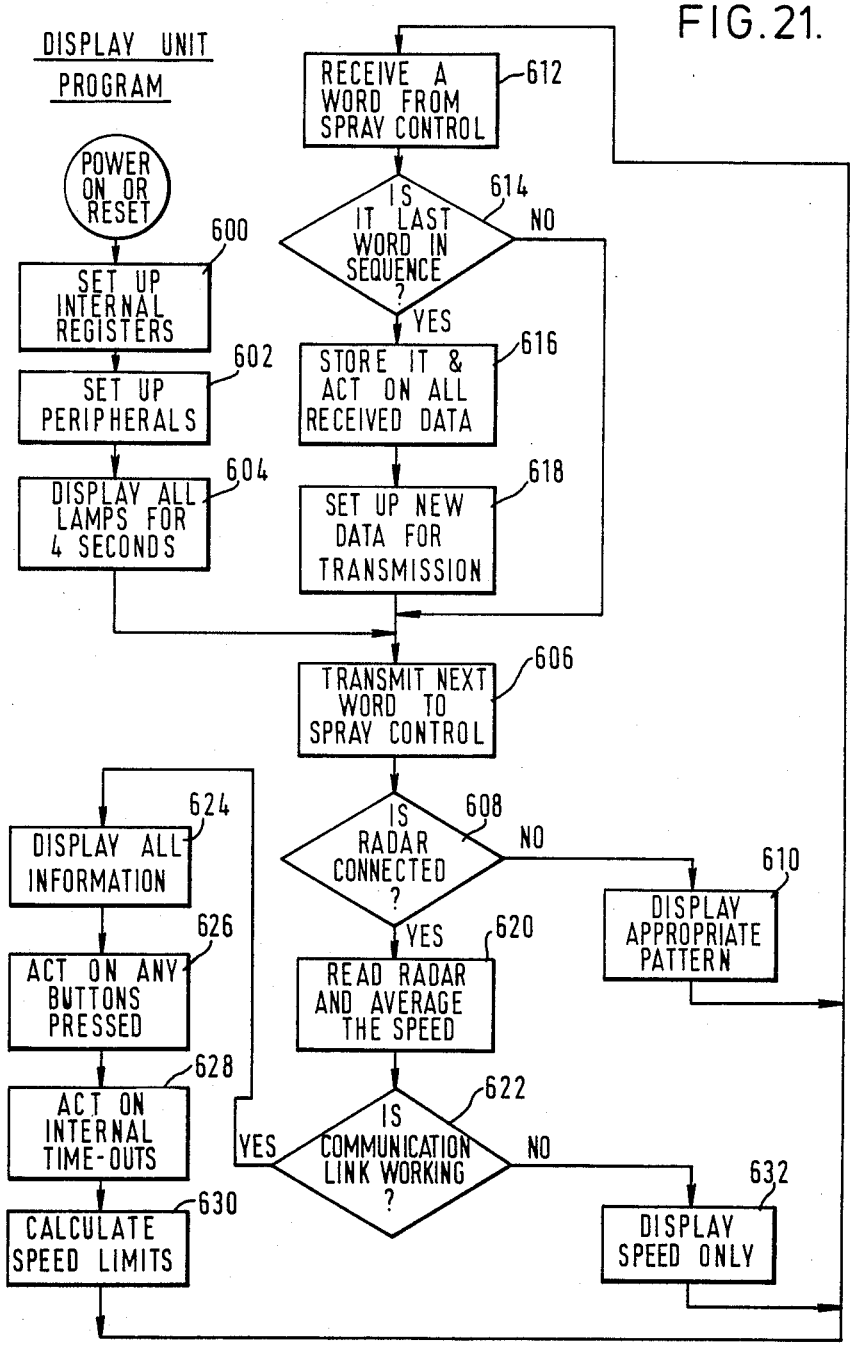

FIGS. 18-20 comprise flow charts for exemplary programs to be used in conjunction with the spray control unit microprocessor shown in FIG. 6;

FIG. 21 is a flow chart for an exemplary program to be used in conjunction with the display unit microprocessor shown in FIG. 6.

Figure 1:
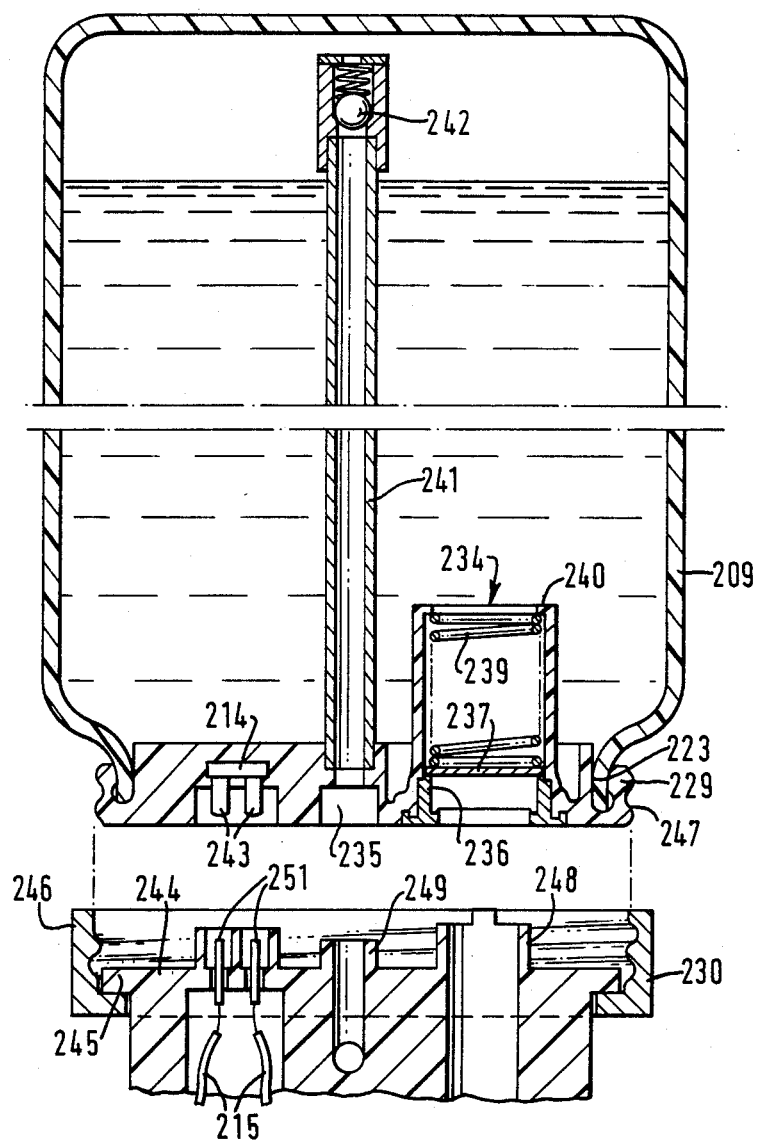
FIG. 1 is an axial section through a container according to the invention and a connector therefor.
Figure 5:
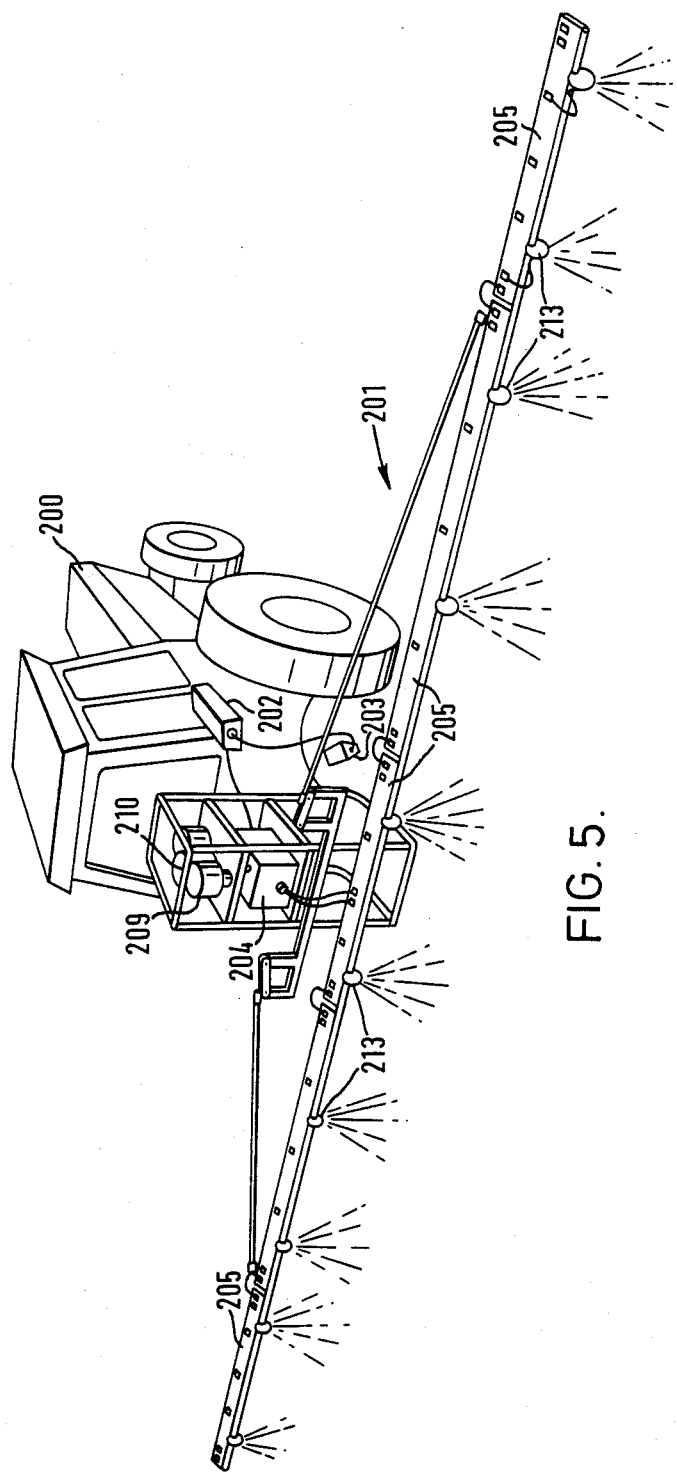
FIG. 5 is a diagonal rear perspective view of containers according to the invention mounted on a tractor.

Referring now to FIG. 1 a container 209 as provided by the present invention is shown inverted over a connector 230 for coupling the container to a tractor mounted spraying system (see FIG. 5).

The container is, in some respects, the cornerstone of the entire spray system. It protects against unauthorized filling; it provides automatic control over critical spray parameters; it provides a closed fluid system which requires no mixing by the farmer; and it is consequently safe to operate. In fact, the container itself becomes a peripheral part of the data processing portion of the spray system.

The container 209 is shown inverted, having a cap 229 which is of a resilient plastic material which can sealingly grip the edge 223 of the container opening. The cap is fitted with a supply outlet 234 and a vent inlet 235. Inside the supply outlet 234 is a shaped sealed ring 236, formed of rubber or like material. A sealing plate 237 is urged against sealing ring 236 by compression spring 239 the other end of which about a circumferential flange 240 within the upper end of outlet 234. Secured inside the vent inlet 235 and extending toward the upper end of the container 209 is an elongate duct 241, at the inner end of which is a spring-loaded ball valve 242, sealing the duct 241 against leakage of fluid from within container 209, but permitting air to enter container 209 when the pressure differential is sufficient to overcome the spring-loading of ball valve 242. The cap 229 also carries a memory device in the form of a pre-coded microcircuit chip 214 mounted to communicate via external conductive socket connections 243. The outer edge of cap 229 carries a thread 247, and for transport and storage carries a protective threaded cap lid (not shown).

The container 209 is mounted on the system via the connector 230, shown immediately below it in FIG. 9. This comprises a cover member 244 formed with a flanged edge 245 supporting a freely rotatable threaded collar 246 which can engage with thread 247 to hold cover member 244 and cap 229 tightly together. Cover member 244 is formed with a projecting supply pipe 248 to mate with outlet 234, a projecting vent pipe 249 to mate with vent outlet 235 and female electrical contacts 251 to mate with male sockets 243. Connections 215 from contacts 251 lead to microprocessor 206; supply pipe 248 leads to sensor 216 and thence to liquid circuit 212 while vent pipe 249 leads out into the atmosphere. Pipe 248 projects to a height sufficient so that, when cap 229 and cover 244 are in close contact, sealing plate 237 is lifted off sealing ring 236 so liquid can flow out around the edges of plate 237 (which for this purpose are preferably partly cut away) into pipe 248.

Figure 2:
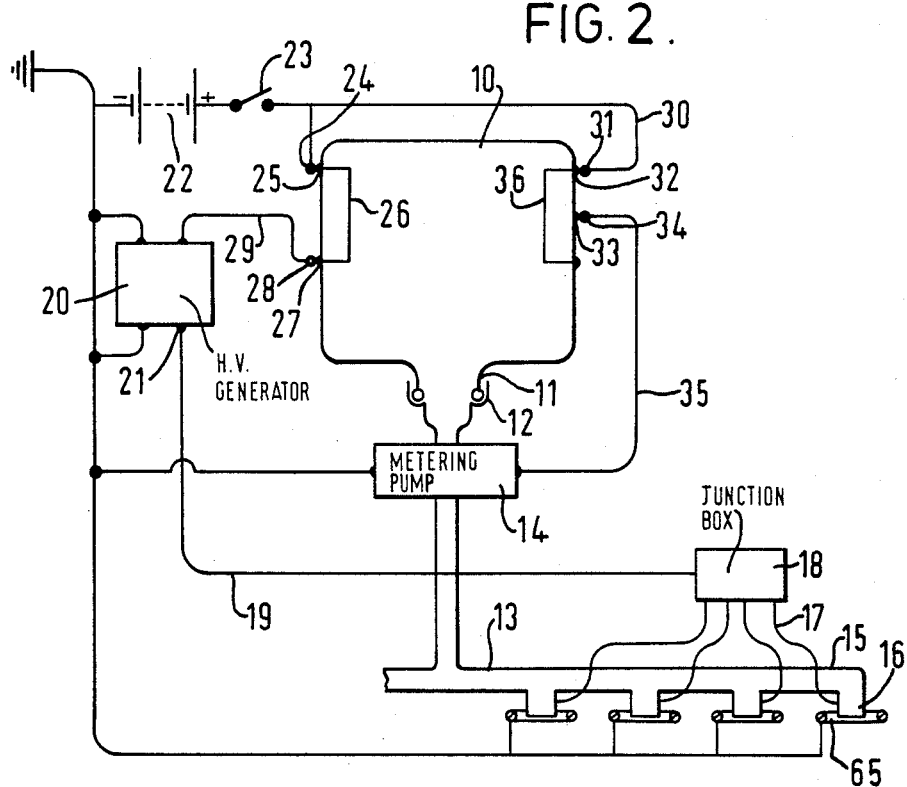
FIG. 2 is a schematic diagram of a first embodiment of a system including a container according to the invention.

The system of FIG. 2 is mounted on a tractor (not shown). It comprises a demountable container 10 (e.g. of about 25 liters capacity). A male screw-thread coupling liquid-tight seal with corresponding female screw-thread coupling 12 carried on the tractor and forming part of the liquid distribution system 13. Liquid delivery system 13 leads from coupling 12 via an electrically operated metering pump 14 to a spray boom 15 carrying a number of sprayheads including nozzles 16.

Figure 3:
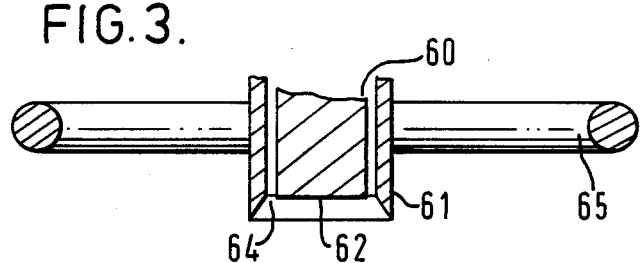
FIG. 3 is a vertical section through a sprayhead assembly forming part of the system of FIG. 2.

The construction of these is shown in more detail in FIG. 3. Each nozzle is surrounded by an annular electrode 65 which is earthed. The body of each nozzle is made of electrically-conducting plastic, and is electrically connected via leads 17 to a junction-box 18, which communicates via high-tension lead 19 with one high voltage output terminal 21 of high-voltage generator 20. Generator 20 is powered from the 12-volt tractor battery 22 via the container 10.

FIG. 3 is a detail, in vertical section, of a typical electrostatic sprayhead used in the invention. It comprises a nozzle 60 having a liquid outlet or mouth 64 in the form of an annular gap between an outer hollow cylinder 61 formed from conductive plastics and an inner solid cylinder 62 formed from conductive plastics. Around nozzle 60, and behind the mouth 64, an annular electrode 65 of bare metal is symmetrically disposed.

The positive pole of the tractor battery 22 is connected via switch 23, to a contact 24 carried on the tractor. This abuts a contact 25 on the container, which connects via a memory device 26 to a contact 27 on the container abutting a contact 28 carried on the tractor. Contact 28 is connected via lead 29 to an imput terminal of generator 20. By a similar arrangement, high impedance pump 14 is powered from battery 22 via container 10. Lead 30 conveys current from battery 22 via switch 23 to a contact 31 carried on the tractor. This abuts a contact 32 on the container, which connects via a second memory device 36 to a contact 33 on the container which, in turn, abuts a contact 34 on the tractor. Lead 35 connects contact 34 to pump 14.

In operation, the container 10 is supplied from the manufacturer, having been filled with a suitable organic liquid (pesticide or herbicide) formulation and sealed under safe factory conditions. At the factory the devices 26 and 36 are adjusted to values suitable to the liquid in the container. This is conveniently carried out in a way which prevents the user from subsequently changing the setting; e.g. the devices 26 and 36 may be adjustable only from inside the container. At the site where spraying is to be carried out, the container 10 is mounted on the tractor, unsealed and coupled to the liquid delivery system 13 via couplings 11 and 12, ensuring that the four sets of contacts 24,25; 27,28; 31,32; 33,34 are in electrical contact. It will be appreciated that the contacts and the pre-set electrical devices 26,36 may be located at any convenient location on container 10 and may comprise an electrical plug and socket assembly. The tractor is then driven past the crops it is desired to spray, and the switch 23 closed. This activates the pump 14 and the generator 20, the output of both being controlled to the desired degree by control of the voltage and/or current supplied to each, which is a function of the setting of devices 26 and 36. Spray is conveyed to nozzles 16 by the action of pump 14, where the spray is charged by direct contact at the potential delivered by generator 20. Spray leaving the nozzles 16 breaks up into electrically charged droplets under the action of the electrostatic field between nozzles 16 and earthed electrodes 65, and is attracted to the plants or earth to be treated.

Figure 4:
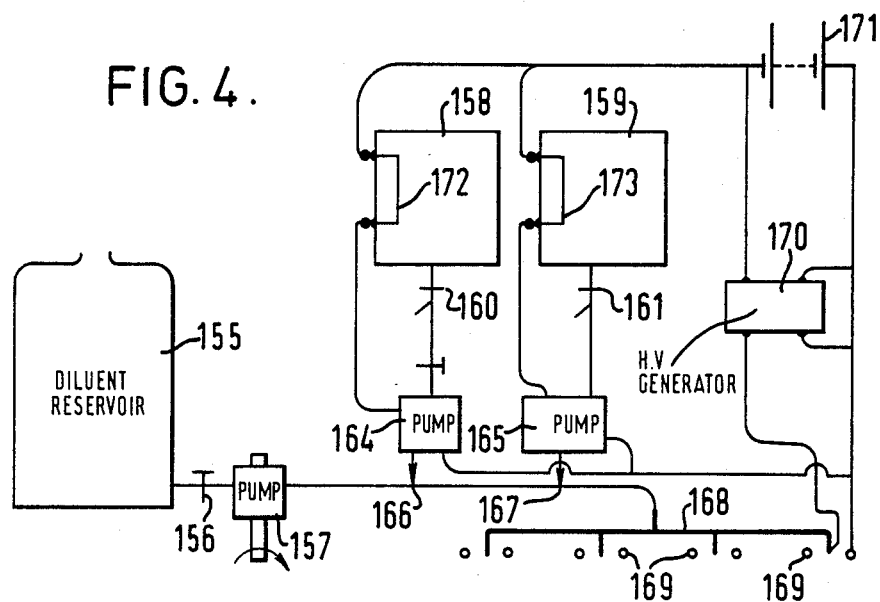
FIG. 4 is a schematic diagram of a second type of spraying system including containers according to the invention.

In the system described above with reference to 2, the contents of container 10 are sprayed without dilution. FIG. 4 shows a tractor-mounted system in which dilution takes place; this however is carried out automatically, without the need for any manual mixing and consequent risk of errors or accidents.

The system of FIG. 4 comprises a reservoir 155 for diluent (e.g. diesel fuel) for delivering diluent via a tap 156 to a mechanical pump 17 driven by the tractor power take-off. Two containers 158, 159 of generally similar type to that shown in FIG. 2 contain concentrated organic liquid pesticide formualations and are connected via couplings 160, 161 to metering pumps 164, 165 which serve to inject pesticide into the diluent stream at 166, 167. From here the diluted formulation passes to a boom 168 carrying electrostatic sprayheads 169 of the same as shown in FIG. 2. The sprayheads 169 are connected to one high-voltage terminal of a high-voltage generator 170, powered by the tractor battery 171. No provision for varying the output voltage of generator 170 is illustrated, though such may readily be provided if required. Metering pumps 164, 165 are also powered from battery 171 via memory devices 172, 173 mounted on containers 158 and 159, in the same way as battery 22 powers pump 14 in FIG. 2. In operation, the rate at which pesticide or herbicide from containers 158, 159 is provided to pumps 164, 165 is controlled by the voltage and/or current which, in turn, is controlled by the setting of devices 172,173, without the need to make up special formulations. To spray two different incompatible pesticides, the flows from containers 158 and 159 may be directed to separate sprayheads. To spray an aqueous liquid pesticide formulation, use may be made of the electrostatic system for forming and spraying emulsions described in our copending UK patent application No. 8102823 of Jan. 30, 1981 entitled "Spraying Emulsions"now published as UK No. 2,092,025A and corresponding to U.S. application Ser. No. 341,174 filed Jan. 20, 1982.

Systems such as that shown in FIG. 4, containing a separate source of diluent, may conveniently be made to flush pesticide out of the nozzles and liquid delivery system, using pure diluent. The system is thereby cleaned for re-use with different pesticides. Such flushing may be made automatic.

In our invention, it is not necssary that flow through the liquid delivery system be determined uniquely by the pre-set devices 172,173 carried on the container. It is possible, for example, for the pre-set control to determine a base value for the flow rate corresponding to a standard vehicle forward speed. Means may then be supplied to sense the actual forward speed of the spray vehicle and vary the flow rate from this standard as necessary so as to compensate for variations from the standard forward speed, in such a way that the amount of pesticide delivered per unit area remains constant over a range of forward speeds. Speed may be sensed by the rotation rate of a vehicle wheel, or by doppler sound or radar measurements. It is also possible to provide means for the spray operator to vary the standard flow rate, e.g. in exceptional circumstances. For example, a crop heavily infested with pests may be usefully sprayed at 150% or 200% of the rate; and a lightly infested one at 50% or 75% of the normal rate.

As an added safety measure to prevent refilling with concentrated toxic materials by spray operators under potentially hazardous conditions, the containers may include a device preventing re-use. Such a device may be of a type that has to be re-set at the factory once the container has been emptied, e.g. a fuse in the lowest part of the container which overheats and blows when no longer covered with liquid. It may be somewhat more complex, e.g. a device measuring liquid flow-rate out of the container, which, after the container has been emptied, modifies the memory device to cause the control means to stop operation of the delivery system.

If desired, the delivery system may include one or more electrostatic valves of the type disclosed in U.S. Pat. No. 4,275,846.

Figure 14:
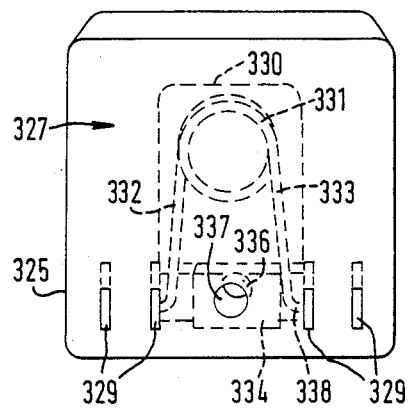
FIG. 14 is a front view of the socket half of another type of electrical connector useful in the embodiment of FIG. 6.

Liquids sprayed by the process of our invention may be solutions, emulsions, or free-flowing suspensions of finely-divided solids in liquid. Instead of the annular nozzles shown in the drawings, it is possible to use one or more linear sprayheads, e.g. of the type shown in UK Pat. No. 1569707 (FIGS. 12-14).

A system including containers of the invention is shown in FIGS. 5-21. This system was developed in conjunction with others skilled in the design of digital electrical circuits and may include other inventions and/or inventions of others claimed in other applications to be filed subsequently or concurrently.

Referring first to FIGS. 5 and 6, a tractor 200 has mounted on it a modular spraying system 201 comprising a cab or display unit 202, a radar unit 203 a trailer or spray control unit 204 and a spray boom 205. The trailer unit 204 and the cab unit 202 each contain electronic data processing circuits in the form of respective electronic data processing circuits in the form of control microprocessors 206, 207 which communicate with each other via a simple serial data link comprising lines 208, 218. The trailer unit 204 further carries demountable containers 209, 210 containing pre-formulated spray chemical and a demountable container 211 containing flushing diluent.

Fluid from the containers 209, 210 and 211 may be made to pass through fluid circuit 212 (described in more detail in connection with FIG. 9 below) to electrostatic spray heads 213 mounted on the boom 205.

The radar speed monitor allows automatic compensation for variations in forward speed to maintain accurate chemical dosage. As shown, this is an add-on unit to the tractor but it is anticipated that built-in radars will become increasingly standard in future tractors.

Each container carries a signal means in the form of a memory circuit (preferably an integrated microcircuit) coding device 214 which is pre-coded with information and which electrically communicates with trailer microprocessor 206 via data links 215. Microprocessor 206 also communicates with liquid detectors 216 which feed it information via data links 219 and with electrical valves 221 and pumps 228 to which it sends instructions via data links 222, 220, respectively. Microprocessor 206 also sends instructions to nozzles 213 via data link 227 (typically a simple serial "daisy-chain" type of link). Of course, as will be appreciated, each data link contained wholly or mostly within the environment of the trailer unit housing the CPU 206, containers, liquid pumps, liquid sensors, valves, etc. (e.g. 215, 219, 222 and 220) may actually comprise many separate conductors directed to/from respective ones of the various container coded memory circuits, liquid detectors, valves, metering pumps, etc. The data link which extends therebeyond, (e.g. to the nozzles and boom sections and/or to the cab unit are preferably simple series two wire digital links to minimize the complexity of cabling and connectors necessary to complete the system in the hostile environment of heat, light, humidity, vibration, etc.

Microprocessor 206 is also preferably provided with an internal timer. The cab unit 202 comprises, as well as microprocessor circuits 207, a panel 223 (see FIG. 10) having controls by means of which the tractor driver gives instructions to microprocessor 207 and displays 225 by which the microprocessor 207 passes information to the tractor driver. The radar unit 203 feeds information about tractor speed to the microprocessor 207 via data link 226. Electrical power is supplied to operate all systems from the tractor battery.

It is important to note that each module (cab unit, trailer unit, radar, boom section, spray fluid containers, sprayheads, etc.) are interconnected by relatively simple and reliable connectors. Extra boom units or sprayheads can be added at any time. And the electronics can be designed (e.g. programmed) to automatically adjust to such additional components. These interconnections are illustrated in FIG. 6.

Figure 10:
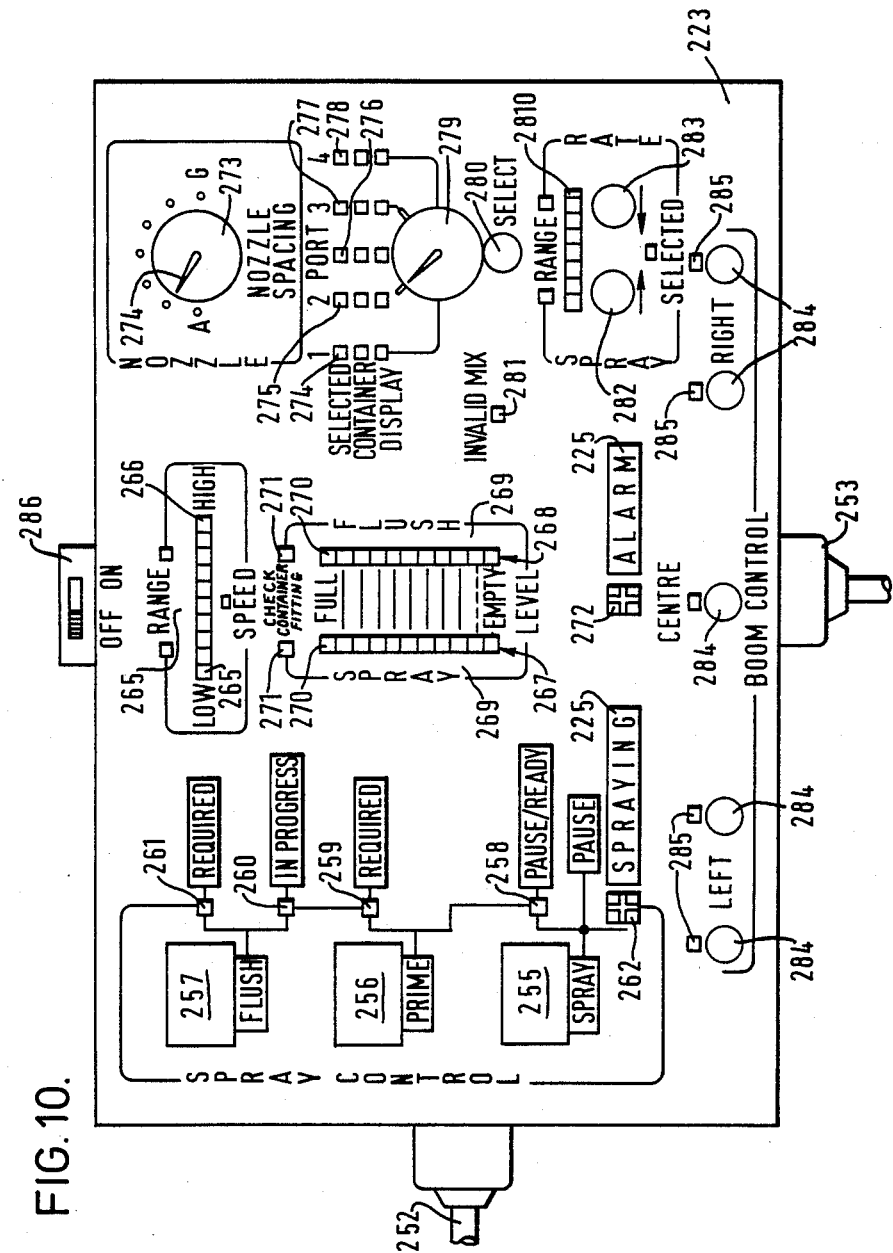
FIG. 10 is a top view of the cab unit shown in FIG. 6.

The operator's panel is shown at FIG. 10 and is explained in more detail subsequently. However, an initial overview of the system operation is most easily understood by reference to operator console or "Cab Unit", shown in FIG. 10. There are three main sections: (1) routine controls on the left hand side; (2) monitoring displays in the middle and on the right hand side; and (3) controls to set spraying conditions on right hand side.

On the left hand side the operator's routine controls are to start or prime the system, spray, pause while turning the tractor and to flush after completing the field. The monitoring section indicates the allowed speed range, volume of chemical remaining and any fault or alarm conditions. The right hand section for selection of spray conditions is used to override the recommended applications rate, to select mixes of different chemicals and to record the separations between nozzles (which are operator set as desired by moving and securing individual nozzles to a slide bar on each boom section). A switch selection of the number of connected nozzles may also be provided if provisions are not otherwise made to automatically count the number of spray heads connected into the system at any given time. However, it is anticipated that a given farmer will rarely change these settings. In this case the system operates fully automatically. If the required chemical cannisters are connected, pressing "prime" and then "spray" controls will automatically apply the chemical at the recommended application rate.

In operation the tractor driver switches on the system and selects the desired chemical (e.g. from container 209) using controls 224. Microprocessor 207 then instructs microprocessor 206 to open the appropriate solenoid valve 221, and to activate the appropriate pump 228 at a basic pumping rate determined by information precoded on memory chip 214 associated with container 209. The basic pumping rate is however modified according to data received from radar unit 203. This unit measures tractor forward speed, and communicates it to microprocessor 206 via microprocessor 207. Microprocessor 206 computes the pumping rates necessary to keep the spray delivery rate per unit area constant at the desired value with changes in tractor speed, and instructs the appropriate pump 228. Microprocessor 206 also activates electrostatic spray nozzles 213 at a basic voltage determined by information pre-coded on the corresponding memory chip 214, and varies this voltage as the pumping rate is changed (the higher the pumping rate the higher the voltage) so as to maintain spray electric charge and droplet size within desired limits.

While it might be thought better to use only one CPU and thus simplify and reduce the cost of the required electronic circuits, the present split CPU arrangement has been discovered to be more advantageous for an agricultural spray apparatus of this type. This is so because for example, much more complex communication circuits would otherwise be required between the cab and the trailer units. In this adverse environment, such complex data communication circuits are not only more expensive, they are probably less reliable. Accordingly, it is preferred to provide CPU facilities at both the cab and trailer sites with any required intercommunications being via simple serial data transmission lines. Thus only a simple two conductor connection, for example, may be required between the cab unit and the trailer unit. In a modular agricultural spraying system of this type, the cost of interconnecting the modules is considered important. The chosen distributed logic architecture of the electronics minimizes such interconnection costs. The containers, boom sections, and nozzles communicate with them trailer console which, in turn, communicates to the main processor (in the cab) via a simple two wire serial data link.

The system can be divided into the operator functions that take place in the vehicle cab and the functions related to controlling, pumping and sensing the spray liquids from container to nozzle. These two functions are physically separated by some meters and the design aim is to minimize the wiring between them and to provide easy installation and security of operation. Using one central computer controlling all functions would require 20 to 30 separate connections between cab and spray system. In order to reduce this, additional electronics are required at each location to "serialize" the data. With low cost processing power available (e.g. in the form of 8-bit microcomputers), it has been determined that distributed microprocessor architecture is the most cost effective and reliable way to achieve a spray system of this type. A microprocessor in the cab unit and in the spray system reduces the connectors to only two data wires between these locations.

A single microprocessor in either the cab or trailer unit may typically require eleven integrated circuit "chips" to carry out all functions. These interface with conventional analog buffers and other I/O circuits to drive and sense the spray system elements and display. Dividing the functions between two processers as taught here may, for example, require seven integrated circuits with the spray hardware, and six integrated circuits with the display in the cab—an increase of two integrated circuit chips. This is an increase of about 5% in the cost of the computing circuits against a saving in cable from 30 to 2 conductors, over up to 4 meters. The saving in cable, connectors, and installation dramatically outweigh the increase in the cost of electronics, especially as the environmental requirements in the adverse environment of toxic chemicals, heat, dust, sunlight, etc. may make expensive cable necessary.

Figure 7:
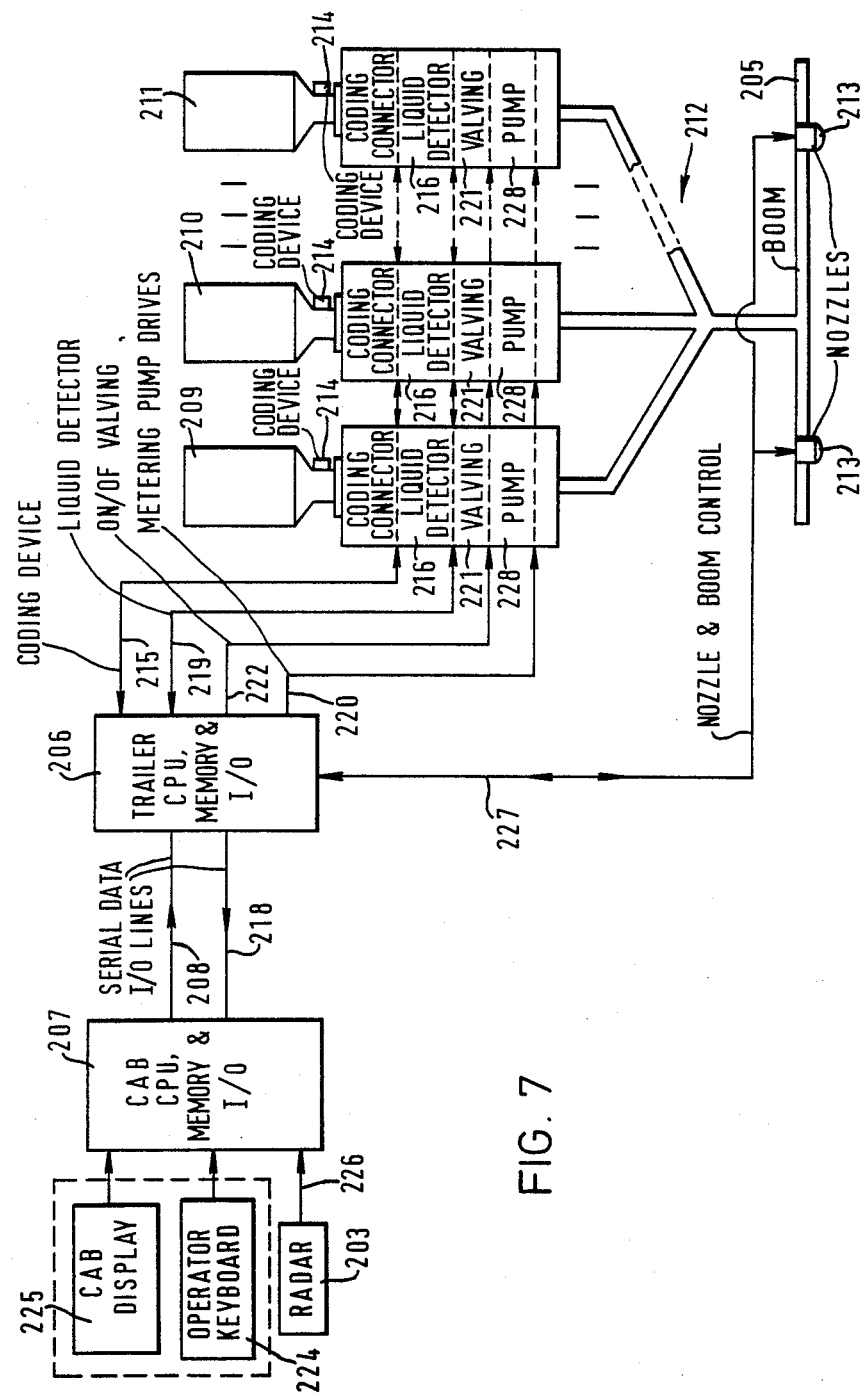
FIG. 7 is a schematic diagram of the architecture of the electronic hardware within the system of FIG. 5.
Figure 8:
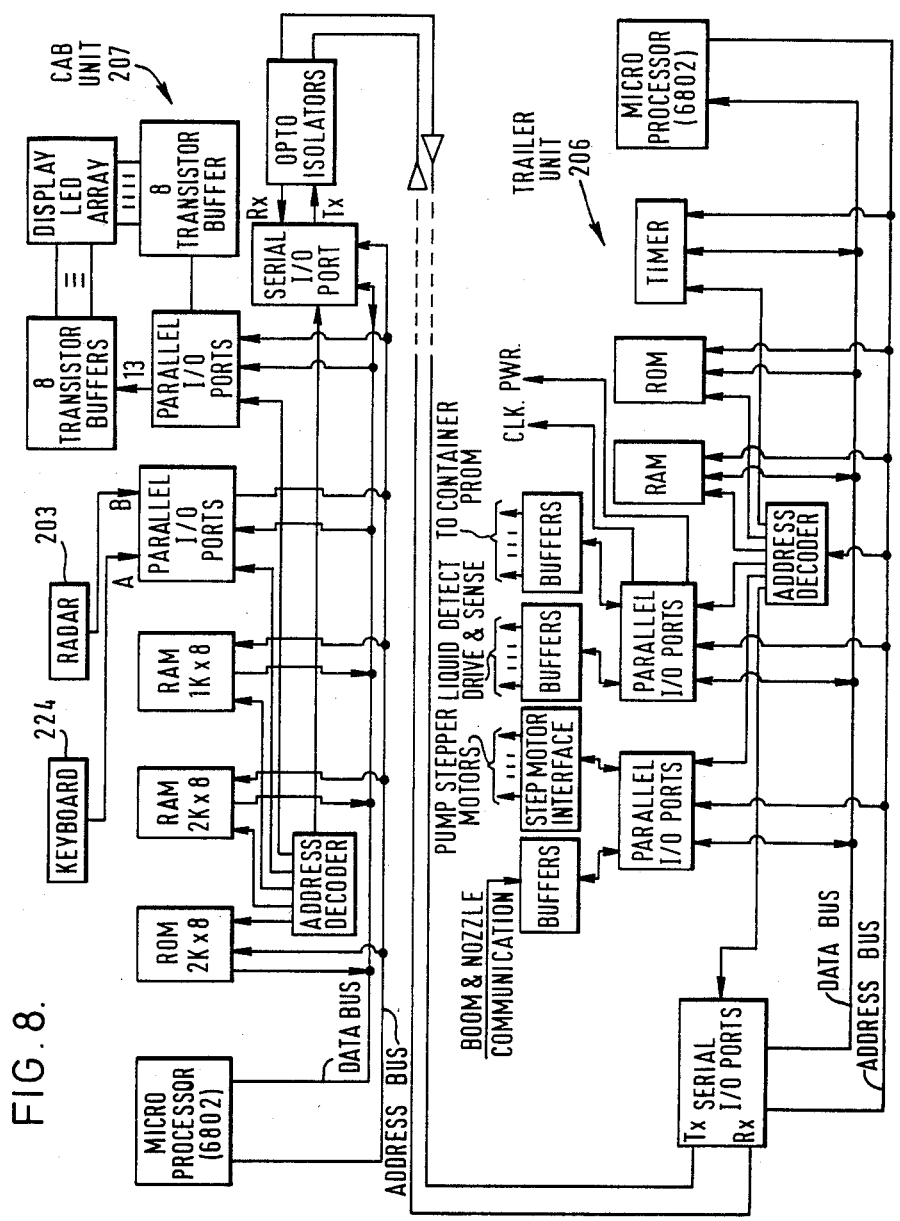
FIG. 8 is a more detailed schematic diagram of the architecture of the electronic components of the system shown in FIG. 7.

The distributed logic architecture is shown generally at FIG. 7 and in more detail at FIG. 8. In FIG. 8, it will be seen that the electronic hardware architecture at each individual site (i.e. the cab unit and the trailer unit) is basically a conventional bus-connected microprocessor electronic data processing system. An important novel feature of the overall architecture is the the distribution of logic control circuitry between the cab unit and the trailer unit so as to provide a more reliable and economic agricultural sprayer.

The various individual components shown in FIG. 8 may be purchased commercially and may typically be:

TABLE I

|  | Integrated circuit type |
|---|---|
| Microprocessor | 6802 |
| Address Decoder | 741LS138 |
| ROM" | 2716 |
| Parallel I/O Ports | 6821 |
| Serial I/O Ports | 6551 |
| Transistor buffers | BD437 |
| Stepper Motor Interface | 2N3055 |
| Timer | PA6840 |
| Opto Isolators | 2N33 |
| RADAR unit | Plessey POME 20/Dev |

Suitable programs for the microprocessors of FIG. 8 are described below by an operational description of the intended system functions and by program flow charts shown at FIGS. 18-21.

The cab unit includes the display and control panel, which is connected to the processor as a multiplexed 10×8 array. The processor implements the operator control sequence and drives the display accordingly. It receives information from the trailer unit about liquid levels, the presence of liquid in the pipes, and the condition of nozzles. It transmits operator commands to the spray trailer unit to control solenoid valves and pumps. It informs the trailer unit of the output of the radar speed measurement system, with which it communicates. The display is shown in FIG. 10.

The trailer unit processor monitors and overwrites the information in the container coding devices. It adjusts the rates of the delivery pump with reference to the set flow rate and information received from the cab unit, (i.e. required delivery rates, nozzle spacing, chemicals selected and vehicle speed). It communicates with and controls the nozzles on the spray boom, monitoring their condition and number, and controlling the high voltage. It communicates their status to the cab unit as described above. The processor interfaces with the trailer unit hardware via an analog control board as should be appreciated.

Various elements of the system will now be described in more detail.

Figure 9:
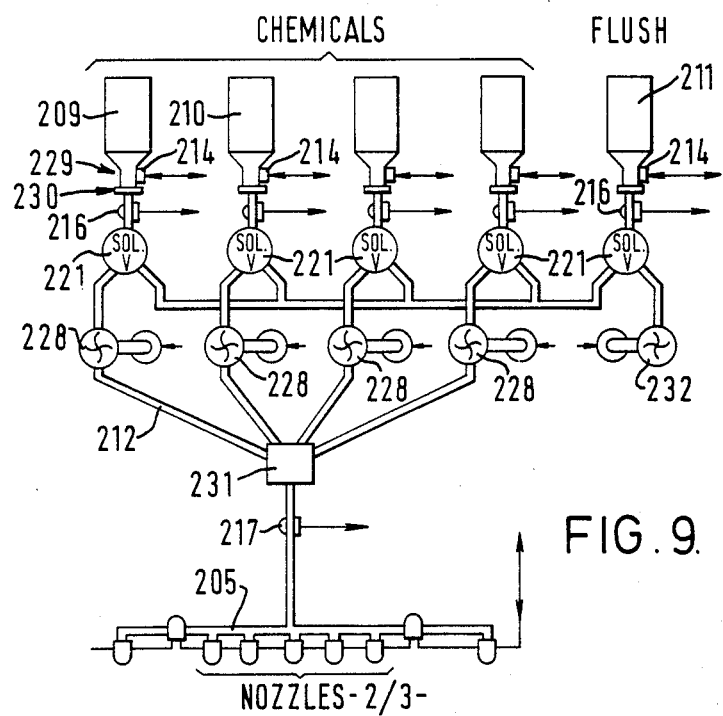
FIG. 9 shows the fluid circuit of the embodiment of FIG. 5.

FIG. 9 shows the fluid circuiit 212 in more detail. Feeding it are containers 209, 210 of formulated chemical and another container 211 of flushing diluent for cleaning the circuit after use. Each container has a cap 229 containing a memory circuit 214 pre-coded with information relating to the container contents, and including mated mounting apparatus 230 for demountably attaching the container to the system. The container and mount 230 are described in more detail in connection with FIG. 9 below. Liquid can pass from each container to infra-red liquid detection devices 216 (which report to trailer microprocessor 206 the presence or absence of liquid) and thence to 2-position 3-way solenoid valves 221. These valves, in the "on" position, connect the adjacent container into fluid circuit 212; in the "off" position, they block passage of fluid into circuit 212 and thus bypass the associated container.

Hence the selected fluid passes via pumps 228 to junction box 231. Pumps 228 are preferably metering gear pumps provided with stepper motors, and are controlled by microprocessor 206, as are also solenoid valves 221. Alternatively, a non-metering pump may be used in conjunction with a conventional flow metering arrangement. Beyond junction box 231 is a further liquid detection device 217 for reporting the presence or absence of liquid to microprocessor 206. From here, the liquid circuit 212 leads to boom 205 and terminates in nozzles or spray heads 213. At the opposite end of circuit 212 is an air pump 232, also controlled by trailer microprocessor 206, which may be used to clear circuit 212 of liquid.

Operation of the fluid circuit 212 is as follows. The tractor driver selects one chemical to be sprayed (say the chemical in container 209), using controls 224, (alternatively he may select both chemicals for spraying together; if they are compatible) and activates the "Prime" control. Microprocessor 206 is then instructed to move solenoid valve 221 to the "on" position, so that liquid enters the circuit 212 from container 209 as far as the corresponding pump 228. Microprocessor 206 also activates the pump 228 to pass liquid through the circuit 212 to liquid detector 217. This reports the presence of liquid to microprocessor 206 which in turn communicates with microprocessor 207 to cause the display 225 to indicate that the system is ready to spray, and turns off the pump 228. The operator now activates a "Spray" control on the cab unit 202 and drives the tractor over the terrain it is desired to spray. The radar unit 203 senses the tractor's forward speed and, as soon as this is within operational limits, the microprocessor 206 is instructed to start metering pump 228 so as to supply liquid to the boom 205 and nozzles 213.

During spraying, the microprocessor 206 senses the volume of liquid withdrawn from container 209 (by integrating the pumping rate over time). Each time a predetermined amount e.g. 1% or 10% of the liquid capacity of container 209 has been withdrawn, the microprocessor 206 revises the contents of memory circuit 214 on container 209, making a permanent entry (e.g. by severing fusable links in a PROM circuit) in this memory. If the volume of liquid withdrawn from container 209 as permanently recorded in memory 214 should reach 120% of the nominal container capacity, microprocessor 206 is programmed so as not to permit any further pumping—this prevents container 209 being refilled except under factory conditions. Also, when container 209 empties in the course of operation, so that its adjacent liquid sensor 216 begins to register absence of liquid, the microprocessor 206 will make a permanent entry (e.g. by severing fusible links in a PROM circuit) in the memory 214, to prevent further pumping, thus effecting the same purpose.

After spraying the desired target, the driver reactivates the "Spray" control, which causes spraying to cease. He may then clean the system out with flushing liquid. Activating the "Flush" control will cause microprocessor 206 to control the valve associated with container 209 to close and the valve associated with container 211 to open. Pump 228 is again activated, and flushing liquid passes for a pre-set time through the previously used portion of circuit 212 and out through nozzles 213. Finally, microprocessor 206 will close valve 221 by container 211, and activate airpump 232 to pass air through circuit 212 until it is clear of liquid.

The container coding device 214 is preferably a custom-designed bipolar fusible link PROM. For example, a standard 32×8 Bipolar Fusible Link PROM may be adapted to this use by incorporating conventional I/O microcircuits therewith to form a single special purpose or customized integrated circuit especially adapted for this use. It is preferably physically integrated into the cap of every legitimate fluid container and is electrically connected to the trailer unit electronics upon attaching the container for use. The PROM is pre-coded with information pertaining to the chemical during the filling opertion. The PROM contents are subsequently irreversibly updated during usage with data representing the remaining volume of liquid. A check should be made when interrogating the container during usage to insure that all pre-coded information is of a correct and legitimate format. Such a format check may be reinforced, if desired, by a coded "handshake" exchange of communication between the container and the spray system before usage is permitted. Typical memory allocation for a given container may be:

TABLE II

| | Read Only | |
|---|---|---|
| a. | Handshake security code | 8 bits |
| b. | Acceptable flow rates, per unit area, minimum, maximum, optimum | 12 bits |
| c. | High voltage setting | 4 bits |
| d. | Container size | 8 bits |
| e. | Chemical type | 16 bits |
| f. | Formulation data | 8 bits |
| | Read/Write | |
| a. | Liquid quantity | 120 bits |

The read/write data in container coding device 214 indicates the quantity of liquid left in or so far removed from the container. This is preferably updated in a non-reversible manner. A fusible link PROM is one possible device that may be used. In one possible coding scheme, one bit per increment of quantity stored is used. If 1% increments are used and up to 120% of the potentially available volume is permitted to be used before disabling the sprayer (thus allowing for a margin of error), it follows that 120 bits would be required.

The data required for container coding may, for example, be held in an 80 bit store implemented as a 10 by 8 bit array. It may be conveniently read as 10 serial words of 8 bits each over a synchronous or an asynchronous serial link. Preferably a custom CMOS device could be used (including any required I/O interface) for all container and chemicals. This custom device would have the proper Read Only information inserted on the container filling line. The "Read/Write" portion of the PROM would be left unwritten so as to indicate a full container. Then, during use, the spray system will write data (by electrically breaking fusible links) as appropriate to represent metered liquid usage. A handheld interrogation unit may be designed if desired to permit a user to read the entire contents of the container coding device.

A top view of the cab unit 202 is shown in FIG. 10. This connects to the radar unit 203 via demountable plug and socket connection 252 and to the microprocessor 206 into the trailer unit 204 via demountable plug and socket connection 253. Unit 202 incorporates microprocessor 207 (not visible in FIG. 10) which operates the displays 225 shown in the panel 223. It is actuated by input from the radar unit 203, the panel controls 224 and input from the microprocessor 206 in the trailer unit via connection 253. Of course microprocessor 207 also transmits control information to microprocessor 206 via connection 253.

The displays 225 are light-emitting diode units (LEDs), coloured distinctively either yellow or red, and operable by microprocessor 207 to give either a steady light or to flash. Each LED 225 is provided with an adjacent label to show the tractor operator its function.

The spray controls are grouped on the left of panel 223. They comprise three actuating buttons 255, 256, 257 labelled respectively "Spray/Pause" "Prime" and "Flush". Button 255 is associated with a yellow LED 258 labelled "Pause/Ready"; button 256 with a yellow LED 259 labelled "Required" and with a yellow LED 260 labelled "In Progress"; button 257 is also connected with LED 260 as well as with a red LED 261 labelled "Required". Four yellow LEDs 262 grouped together and labelled "Spraying" complete the spraying controls/display complex.

At top centre of the panel 223, the speed of the tractor is shown by a horizontal row 263 of 8 yellow LEDs 264, beginning and ending with red LEDs 265, 266. This row is labelled "Speed" below and "Range" above. Each yellow LED 264 is labelled with the speed it represents (in miles per hour from 2 to 9). Red LEDs 265 and 266 are labelled "Low" and "High" respectively.

At centre of the panel below the "Speed" display is the "Level" display comprising two left and right parallel vertical columns 267 and 268 each of 10 yellow LEDs 269, each terminating in a red LED 270. Above each column 267, 268 and slightly displaced from it is a red LED 271. LEDs 271 are labelled "Check container fitting". The left array 267 is labelled "Spray" while the right is labelled "Flush". The arrays are graduated from "Full" at the top, through "Half" to "Low" opposite the lowest yellow LEDs 269 and the red LEDs 271 are labelled "Empty".

Below the "Level" display, at lower centre of the panel 223 are four red LEDs 272 grouped together and labelled "Alarm".

At top right of the panel 223, the "Nozzle Spacing" control comprises a knob 273 having a pointer 274 which may be set by manual rotation to any of seven positions labelled "A" through "G".

Below the "Nozzle Spacing" control at right centre of panel 223, the "Port" control/display complex comprises a 3×5 array of LEDs, in five vertical columns 274 through 278. LEDs in centre column 276 are unlabelled (they relate to the flushing liquid) which columns 274, 275, 277 and 278 are numbered 1 through 4. The top row of LEDs in the array is labelled "Selected"; the second row "Container"; the third "Display". A control knob 279 may be set by manual rotation to indicate any one of the 4 columns 274 etc. Below knob 279 is a depressible button control 280 labelled "Select". A single red LED 281 to the left of button 280, labelled "Invalid mix" completes the "Port" control display complex.

At lower right of panel 223 is the "Spray Rate" control/display complex. This comprises a row 2810 of seven yellow LEDs, forming a scale labelled from left to right, with application rates they represent (e.g. 7, 10, 15, 20, 30, 40, 50 fluid ounces per acre). Beneath row 2810 are a pair of depressible button controls 282, 283 each labelled with an arrow pointing up or down scale.

Finally, along the lower edge of panel 223 is the "Boom Control" control/display complex. This comprises a spaced linear array of five depressible button controls 284 each associated with a yellow LED 285. The outer buttons 284 are labelled "Left" and "Right" appropriately, and the centre button 284 is labelled "Centre".

A master switch 286 provides power to the display and controls.

In operating, the tractor driver first switches on the master switch 286. This activates the displays 225. The actual state of the displays 225 will now depend on the state of the system. In this description it will be assumed that all switches are off. The "Level" display will then show no light in column 267, but will indicate the level of flushant liquid in container 211 by the number of LEDs 269 which are lit. Alternatively if container 211 is missing or not properly fitted, the corresponding red LED 271 is lit. If all is in order, the driver sets the nozzle spacing as required by rotating knob 273 and selects the required boom sections by depressing one or more of buttons 284. After depressing each button 284 the adjacent yellow LED 285 comes on to confirm the boom section is selected. To cancel selection the button 284 is depressed again and the LED 285 goes out. Now a spray container (e.g. 209) is selected by rotating the control knob 279 to the appropriate control column (say 274) and depressing "Select" button 280. In column 274 all three LEDs are lit; the top LED indicating that container 209 has been selected; the centre LED that it is connected to the system; and the bottom LED that it is registering on the spray display (column 267). Column 267 now registers the liquid level in container 209. If (alternatively) container 209 is badly fitting or absent, the red LED 271 above column 267 will light and the lower LED in column 274 will flash. If (alternatively) container 209 is empty, the centre LED in column 274 will flash, and the appropriate red LED 270 in the "Level" display will light. If the container 209 is nearly empty, the top LED in column 274 will flash, as well as a low level being shown in the "Level" display.

If the operator wishes to check the level in a second container (say 210) he may turn knob 279 so that it indicates the appropriate column (say 275). The bottom LED in column 275 then lights, while the bottom LED in column 274 goes out (the other two LEDs in 274 however remaining lit). The display in column 267 now changes to show the level in container 210.

If the operator wishes to spray a mixture of chemicals from containers 209 and 210 he may now press button 280 again. If the chemicals in containers 209 and 210 are compatible (so that they may safely be sprayed together without damage to crops or spraying apparatus), the top LED in column 275 will light; if not, it will remain unlit and the "Invalid Mix" LED 281 will light.

Assume the operator wishes to spray from container 209 only, so that all three LEDs in column 274 are on, and no other "Selected" LEDs are on in column 274-7. Three LEDs will now be on in row 2810 of the "Spray Rate" display. Two steady lights indicate the maximum and minimum permissible spray rate for the chemical selected. A third flashing light shows the spray rate currently selected. The operator adjusts this to a desired value within the maximum and minimum range by pushing buttons 282 or 283 to increase or decrease the selected spray rate stepwise as may be required. Chemical and spray rate have now been selected.

The operator next turns his attention to the spray control on the left of panel 223. If the liquid circuit 232 is empty, the yellow LED 259 will be lit, indicating "Prime Required". The operator therefore presses button 256. As a result, LED 259 goes out and LED 260 lights, indicating "Prime in Progress". Microprocessor 206 activates pump 228 to cause liquid to flow from container 209 into circuit 232 down as far as nozzles 213. When this is complete, microprocessor 207 turns off LED 260 and lights LED 258 indicating "Pause/Ready". At this stage, two LEDs 264 are lit in row 263 of the "Speed" display. These indicate minimum and maximum forward speeds between which the system can apply the selected chemical at the selected rate.

As the operator drives the tractor over the crop to be sprayed, actual speed is indicated by an LED 264 flashing in row 263. When the speed is within range, and the tractor is on the right path, the operator presses "Spray" button 255. Then LED 258 goes out and the four LEDs 262 light, indicating "Spraying" while voltage and spray liquid pass to the nozzle 213 and spraying begins. To stop spraying for short periods (e.g. to turn the tractor) the operator presses button 255 again whereupon LEDs 262 go off and LED 258 comes on. Spraying is then restarted by a further touch on button 255.

During spraying, microprocessors 206 and 207 continuously monitor tractor speed and change the speed of pump 228 to maintain a constant application rate of chemical per unit area. At the same time they adjust the voltage supplied to nozzles 213 as flow rate changes so as to maintain particle size and charge of the spray droplets within appropriate limits. If tractor speed is not kept within the necessary limits shown in row 263, one of red LEDs 265, 266 will come on, indicating "High" or "Low" as appropriate. If the tractor speed remains outside range for longer than a short pre-set time, spraying ceases, LEDs 262 are extinguished and red "Alarm" LEDs 272 come on, flashing.

When the desired spraying is complete, spraying is stopped by pressing button 255 to show "Pause/Ready" by LED 258; after a pre-set time LED 258 extinguishes and LED 261 lights indicating "Flush Required". The operator presses button 257 initiating the flush sequence while LED 261 goes out and LED 260 lights, indicating "Flush in Progress". Microprocessor 206 closes valve 221 to isolate container 209 from circuit 212 and opens valve 221 to connect flush container 211 into circuit 212. Pump 228 is activated, draining flushant liquid around circuit 212 and out through nozzles 213. After a suitable volume of flushant has been introduced into the system, valve 212 is closed and air pump 232 is activated to empty circuit 212 of flushing liquid. When liquid detector 217 reports no liquid, after a short pre-set time to allow liquid to clear the nozzles, pumps 228 and 232 are switched off, LED 260 goes out and LED 259 comes on, indicating "Prime Required". Master switch 286 may now be switched off, to close the system.

Elements in the spray circuit 212 such as pumps, valves, sensors etc. are conveniently connected together by dual purpose fluid and electrical connectors. A suitable type of connector is shown in FIGS. 11 and 12. The connector arangement comprises two bodies 287 and 288 which are adapted to abut along their faces 289 and 290 and be secured together. The first body 287 is provided with a hole 291 which extends through the body 287 and the end of which is a projecting duct portion 292 from the face 289. The other end is provided with a stub pipe 293 for receiving a flexible liquid hose (not shown). Four smaller holes 294 are also provided, in each of which is fitted an elongate electrically conductive strip 295. One end 296 of each strip projects from the body 287 so as to be readily connectable to an insulated electrical conductor (not shown) while the other end 297 projects from the face 289.

The second body 288 is also provided with a hole 297 which extends through the body 288 and is provided with a stub pipe 298 for a flexible liquid hose (not shown). Four further holes 299 are provided in each of which is located an electrical socket 300 having an elongate strip portion 301 extending out of the body 288 for connection to an insulated electrical conductor (not shown). The hole 297 is adapted to receive the duct portion 292 and a sealing ring 302 is located in hole 297 so as to make a sealed joint with duct potion 292. Similarly the sockets 300 are adapted to receive the ends 297 of the strips 295 and the two bodies 287, 288 can be pushed together until faces 289, 290 abut.

It is often convenient to form the insulated conductor and the flexible liquid hose emerging from body 287 (or from body 288) integrally with one another. It may also be convenient, for connecting together certain parts of the system, to include ball valves in the liqid connector orifices to prevent liquid leakage on disconnection.

A double ball valve which serves to shut both orifices on disconnection is shown in FIG. 13. This comprises two bodies 303, 304 each having a through duct 305, 306 respectively and each having a stub pipe 307, 308 for connection to a flexible hose (not shown). In the duct 305 is located a ball 309 which is urged towards a conical seal 310 by a spring 311. Between seat 310 and the right end of the duct 305, the diameter of duct 305 is reduced, housing loosely a moveable valve actuator 313, movement of which is restricted by two shoulders 314, 315 formed inside duct 305. Extending from each end of valve actuator 313 are stems 316, 317.

The end of duct 305 extends through a cylindrical projecting portion, thereby sealing duct 305. The valve actuator 313 is at the same time urged by ball 309 towards shoulder 315. The body 304 is also provided with a ball 318 urged towards a conical seat 319 by a spring 320, the left end of duct 306 having a diameter which will accept the projecting portion of body 303. An annular seal 323 is located inside the left end of duct 306. When bodies 303, 304 are not abutting, the ball 318 seating on seat 319 seals duct 306 against leakage. When the two bodies 303, 304 are pushed together, however, the projecting portion 322 enters end 324 of duct 306 and stem 317 contacts ball 318. Spring 320 is stiffer than spring 311 and valve actuator 313 is accordingly moved within duct 305 until stem 316 contacts ball 309 and displaces it from seat 310. After further movement the actuator 313 is stopped by shoulder 314, and further approach of bodies 303, 304 causes stem 317 to move ball 318 off seat 319. In consequence, when bodies 303, 304 are fully mated, both ball valves are open. On separating, the action of springs 311, 320 seals both valves again to prevent leakage.

Figure 15:
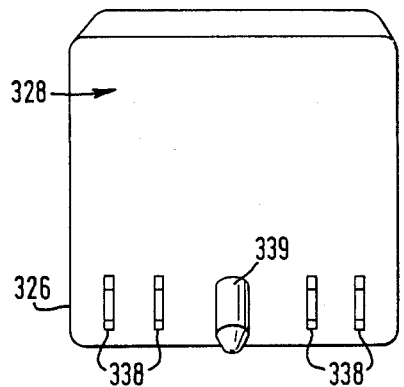
FIG. 15 is a front view of the corresponding plug half of the connector of FIG. 14.
Figure 16:
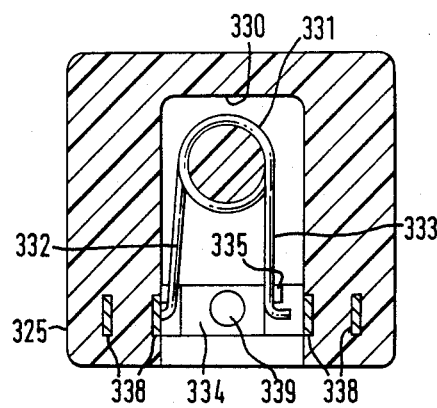
FIG. 16 is a section through the socket half of FIG. 14, in a plane parallel to the face.

In certain parts of the system, in particular the array of nozzles 213 mounted on boom 205, it may be desirable to attach or remove devices (in particular, nozzles) in series without breaking the electrical circuit. For example, if the preferred serial "daisy chain" data communication link is used for the nozzles, the series "daisy chain" should remain unbroken even if a given nozzle is disconnected or a given connection socket is never used. FIGS. 14–16 illustrate an electrical connector which carries out this function automatically. The connector comprises first and second bodies 325, 326 which may be joined so that their respective faces 327, 328 abut. Extending through the body 325 are four electrical conductors 329 with first ends terminating at face 327 in the form of sockets. The second ends of the condutors 329 (not shown) are attached to separate electrical conductors. Mounted in a recess 330 in body 325 is an electrically conductive hairspring 331 having extended legs 332, 333 which are urged into contact with two of the conductors 329. A moveable plate 334 also located in recess 330 is provided with a lug 335 which engages leg 333 so that plate 334 is urged thereby into the position shown in FIG. 14. A hole 336 is formed through plate 334 and a similar hole 337 in body 325, but the two holes 336, 337 are slightly out of alignment when plate 334 is in the position shown in FIG. 14.

Body 326 is similarly provided with four conductors 338 extending therethrough to project from face 328 being disposed so as to mate with the sockets of conductors 329 in face 327. A tapered projection 339 also projects from face 328. When the two bodies 325, 326 are brought together so that faces 327, 328 abut, the projecting conductors 338 enter the sockets of conductors 329 and the tapered projection 339 enters hole 337, and also hole 336 in plate 334. This brings holes 337 and 336 into alignment, sliding plate 334 into the position shown in FIG. 16. In this position leg 335 has pulled leg 333 out of contact with conductor 329. When the two bodies are separated, leg 333 returns to the position abutting conductor 329 that is shown in FIG. 14. It will be seen that when the connector is incorporated in an electrical circuit, the leads attached to conductors 329 will be electrically bridged when the bodies 325, 326 are not joined, while joining the bodies breaks the bridge.

For many purposes relating to the invention it may be convenient to use connections using more than,one, or all, of the features of the connections shown in FIGS. 11–16.

Figure 17:
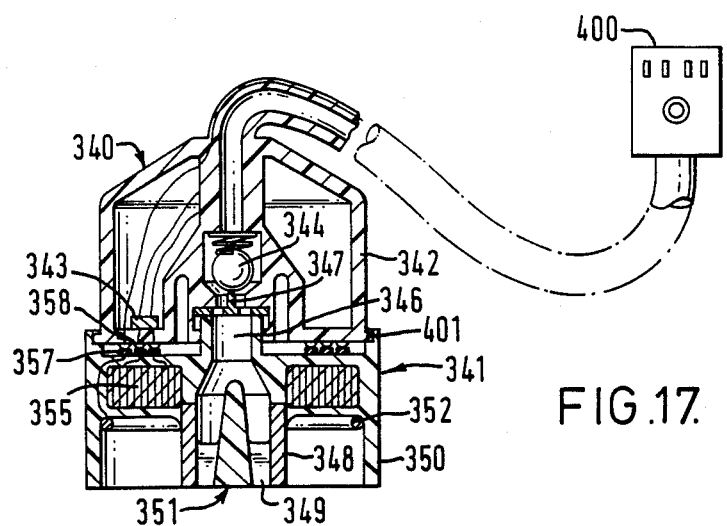
FIG. 17 is an axial section through a sprayhead assembly used in the system of FIG. 5.

Referring now to FIG. 17 the assembly is in two parts: an upper low-voltage housing 340 and a lower high-voltage nozzle-carrier 341. Housing 340 comprises an electrohydraulic connector 400 of the type illustrated in FIGS. 11–16, for connection of the sprayhead in the form of nozzle 351 into liquid circuit 232 and for providing electrical connections with microprocessor 207, a low voltage power source (the tractor battery) and with earth. The connector 400 is joined flexibly to the main body 342 of the low voltage housing 340. This carries an electronic circuit device in the form of integrated circuit 343 which interfaces with microprocessor 206 and a spring-loaded ball valve 344 which seals a central liquid delivery orifice. The external cylindrical surface of body 342 is threaded to receive the upwardly extending threaded skirt 401 of nozzle carrier 341. This comprises a central delivery tube 346 which mates sealingly with the central delivery orifice of housing 342, having an upwardly extending central finger 347 for opening ball valve 344.

In the lower part of tube 346 is positioned a conductive cylinder 348 to form a nozzle 351 having an annular spray orifice 349. Spaced from the orifice 349 is a dependent insulating skirt 350 which protects the nozzle 351 from accidental contacts. Supported within skirt 350 coaxial with tube 346 and cylinder 348 above the level of orifice 349 is a metal annulus 352 co-axial with tube 346 and cylinder 348. Annulus 352 serves as a field-intensifying electrode, and is connected to earth via contact 358 in carrier 341 which abuts contact 354 in housing 340.

Around the upper part of tube 346 is disposed a conventional toroidal high voltage generator 355 of the type using a diode split transformer. The output voltage of generator 355 is fed to cylinder 348 via a suitable conductor. The output voltage of generator 355 is controlled by the input signal fed to it from microcircuit chip 343 via contacts 357 on carrier 341 and contacts 358 on housing 340. Means not shown adjustably secure the housing 340 firmly to a mounting bar on boom 205 (see FIGS. 5 and 6) at any desired spacing. It is usually necessary that the nozzle 351 should be in a fixed orientation at a fixed distance above the crop.

If a nozzle fails in use it may readily be replaced—either as a whole, or by unscrewing (the threaded connections may be of a "quick connect" variety requiring less than a full turn to effect connection or disconnection) nozzle-carrier 341. In this embodiment the nozzle's flow capacity can be increased or reduced merely by changing unit 341 for another unit having a larger or smaller orifice 349. Other embodiments may readily be visualised in which flow capacity may be adjusted by relatively rotatable splined cylinders abutting end-to-end. Such a valve could be set either manually or automatically by operation of microprocessor 206.

The use of a custom I/O integrated circuit 343 to act as a communication interface to the main control microprocessor was described earlier. The same integrated circuit would generate the low voltage control signals for the high voltage generator.

Several important features of the design are as follows:
(a) two part construction;
(b) flexible connection to boom unit using basic electro-hydraulic connector;
(c) lower section contains electrostatic nozzle and high voltage transformer, (removes in quarter turns for quick field replacement);
(d) upper section contains low voltage electronic and data interface;
(e) spray sensor e.g. optic link to lower section (not shown);
(f) spray fault signal LED in upper section (and IC transmits fault signal to display console) (not shown);
(g) permits automatic nozzle count via daisy chain data line (part of custom IC function which, in effect, instructs arithmetic unit of trailer unit controller to set appropriate pumping rates); and
(h) permits automatic signalling of state of viscous restrictor in fluid path. (Manual or automatic selection of restrictor to suit application rate range).

The integrated circuit I/O device 343 performs the following I/O operations at each nozzle site:
(a) Communication with the Trailer Unit on a serial line in a "daisy chain" configuration with the other nozzle devices. This allows the Trailer Unit to automatically count the number of nozzles or spray heads attached to it and to control and monitor them over a very simple connection.
(b) Control of high voltage by driving a high voltage transformer and diode/capacitor stack to maintain droplet size with flow variation.
(c) Monitoring of spray condition and detection of faults.

The system may comprise customized integrated circuits of two kinds; those (214) in the containers 209 etc. and those (343) in the sprayhead assemblies. The former is a memory circuit (possibly including I/O interface circuits) pre-coded with information (range of application rates, voltage, compatibility with other chemicals, etc.) relating to the chemical when the container 209 is filled at the factory. It may also include a security code. Chip 343 in the sprayhead assembly preferably includes an I/O device and communicates with microprocessor 206 in trailer unit 204, which is thereby enabled to count the number of assemblies attached for spraying. Chip 343 preferably also controls the nozzle voltage via the generator 355. And, it could also be used to monitor the manner in which the nozzle sprays or to change effective orifice sizes, etc. Chip 214 may be designed, for example, to store about 80 bits of information as tabulated previously.

This exemplary spray system incorporates these sensors:

(a) speed sensor;

(b) liquid presence sensor;

(c) spray presence sensor (and/or nozzle failure sensor); and (d) flowmeter (not required for self metering gear pump).

Spray nozzle failure may be detected and indicated to the operator in a variety of ways. For example a suitable electro-optic sensor similar to the liquid presence sensor may also be used. The design of the sprayhead assembly allows for the rapid replacement of the lower section or complete nozzle, and for incorporation of a fibre optic spray presence sensor.

The control electronics transmits a failure indication to the trailer unit which is then sent on to the main controller. An additional red light might be employed to indicate that a spray failure has occured. It would be possible to indicate which nozzle by an additional LED array but, to maintain the modular concept of the system, a single signal light on the display is to be preferred with an LED on the actual nozzle housing indicting which nozzle has failed. The user should carry a spare unit and could replace the unit in a few seconds.

The radar unit (see FIG. 5) comprises conventional means for emitting a microwave beam of known frequency forwardly and downwardly in the direction of motion of the tractor, with means for detecting that part of the beam reflected back to the unit and comparing its frequency with that of the emitted beam. The frequency difference is a measure of the tractor speed (Doppler effect) and the information thus obtained is fed to microprocessor 207.

Microprocessors 206, 207 (see FIG. 7) are conveniently of the 6802 type. This is a standard 8-bit processor, of fully adequate capacity, which interfaces with standard memory products and a wide variety of peripheral circuits. Each microprocessor 206, 207 has a computer board with central processing unit, read only memory and 3 or 4 peripheral circuits. The use of two linked microprocessors in the cab unit 202 and trailer unit 204 gives a system with much less complicated and hence cheaper interconnections between the cab and trailer units.

Compensation for tractor speed variations is preferably made dependent upon the output of a radar unit after studying the nature of the errors in radar and other systems. Conventional speed monitors using a wheel, while capable of the required resolution, have fixed offset errors due to slipping or diameter errors. The operator is required to enter the actual circumference and an error may also occur here. In contrast the radar requires no operator setting and once set correctly on the tractor gives true speed indication. A further consideration is that future tractors are likely to have radars fitted by the manufacturers as standard. The cost of a wheel unit and an OEM radar unit are comparable making radar the preferable choice for this sensor requirement.

The liquid presence sensor has two functions in the system. It is used to check the presence of liquid during the priming cycle and to give a positive indication that a chemical container has emptied. In neither case is a quantitive signal required. A suitable electro-optic sensor is presently preferred. That is, a sensor where incident light (for example, conducted in a light fibre) is passed through the liquid medium and the reflected or residual transmitted light is then sensed (again, for example, via a light conducting fibre) to obtain an indication of fluid presence.

To maintain control over the true liquid application rate per unit area the volume of liquid delivered to the booms must be precisely known. For a gear pump with a high volumetric efficiency the delivered volume is given by the angular rotations of the pump which in turn is given by the number of steps of the stepper motor. This is referred to as a self metering mode. If higher volumetric efficiency is desired, an alternative pump and motor combination may be used with an additional flow meter. High resolution is desirable as this decreases the time response of the system and increases spraying accuracy.

A description of the presently preferred embodiment for the computer programs for microprocessors 206 and 207 follows based on the flow charts of FIGS. 17-20.

As previously explained, the preferred embodiment utilizes a microprocessor both in the display unit and in the spray control unit so as to reduce the necessary communication between the two units to only two wires. Preferably, data is passed in this conduit in serial form, as a repetitive sequence. Conventional input/output registers and communication circuits are provided for both receiving and transmitting information in this form at both units.

The display unit processor periodically scans the status of the operator-controlled switches (or of the content of data registers reflecting same) and, if appropriate, formats digital control words for transmission to the spray control unit. Ths spray control unit, in turn, periodically scans the status of its various peripheral units and formats status-indicating/control words for transmission to the display unit processor. Such formatted digital communication words are then periodically and repetitively transmitting between the units so as to complete the communication link.

Repetitive transmissions are preferred so that successive transmission of the same data may be compared before action is taken to thus enhance the overall reliability of the system operation. If a received word is faulty in its parity or synchronization bits or if two successive transmissions of the same word do not have the same "address" or if fault with the received word is in any other way detected, a request for repitition words is transmitted back to the source of the information which requests a repeat of the earlier transmitted information. If the communication process falls out of synchronization, the display unit is caused to transmit the first word of a new sequence while the spray unit controller cycles through the bit sequence until a matching "address" field is discovered. Thereafter, both units commence a normal communication cycle in synchronization. Since such communication processes and apparatus are believed conventional in the art of digital communications, no further detail is believed necessary.

The main or executive program loop for the spray control unit is shown in FIG. 18. Here, at "power on" or "reset38, initializing steps 500 and 502 are performed so that all internal data registers and peripherals associated with the spray control processor are properly initialized. Thereafter, the fluid detectors are interrogated at 504, the containers are interrogated and updated at 506 and the boom and nozzle structures are similarly interrogated at 508. A wait loop at 510 is entered for 10 seconds. If any interrupts are detected within that 10 second interval, then the main loop is re-entered at task 504 shown in FIG. 18. On the other hand, if no interrupts received for a 10 second period, then this indicates a possible fault condition and, accordingly, spraying is stopped at task 512 and control is transferred back to the main loop so that the current status of the spray control unit and its connected peripherals can be updated so that current information will be available for eventual transmission to the cab unit.

The spray control unit is programmed so as to include the two interrupt routines depicted at FIGS. 19 and 20. The non-maskable interrupt routine shown in FIG. 19 is entered whenever a communication word is received from the display unit. After initial entry of this routine, a test is made at 514 to insure that the word is of correct format (e.g. parity). If not, task 516 is entered where the communication circuits are re-synchronized before a normal exit from this routine is made. On the other hand, if the recieved word has the correct form, then a check is made at 518 to see if the addresses of two successive words match. If not, then this is also an indication that the communciation circuits need to be re-synchronized at 516 (which will include an instruction to the cab unit to repeat the transmission that has been attempted) before a normal exit from this routine is made.

If the tests at 514 and 518 are both successively passed, then the received word from the display unit is stored at 520 and a previously formatted communication word is transmitted back to the display unit. A test is made at 524 to see if the control word that has thus successively been received by the spray control unit is the last intended word in what may be a sequence of such control words that must be interpreted in context before further action is taken. If not, a normal exit is made as shown in FIG. 19 so as to permit the transmission of the next word in the sequence. When the last word in the sequence has been received as tested at 524, then the spray control unit calculates the speed/flow and speed/EHT (extra high tension voltage) if spraying is in progress at 526. Suitable action is taken based upon these calculations and upon the received control data at 528. Finally, any internal time-outs are detected at 530 so that any appropriate housekeeping action scheduled to occur at such a time-out may be taken before a normal exit from this routine occurs.

The maskable interrupt routine shown in FIG. 20 is enabled while spraying and is normally triggered every 3 milliseconds. It is used for measuring fluid flow and for adjusting the pump speed and high voltage drive. After initial entry, the flow counter register is updated at 532 to reflect the current fluid consumption and flow parameters. A test is made at 534 to see if it is yet time to adjust the spray parameters (adjustments may only be permitted at predetermined time intervals so as to prevent undue oscillation). If not, a fault light is set at 536 if the flow count is detected as being out of range, otherwise a normal exit is made. On the other hand, if it is time to adjust the spray parameters, then the pump speed is adjusted at 538 and the high voltage drive circuits are adjusted at 540 before a normal exit from this routine. The update of flow counters at step 532 may typically include the purposeful fusing of a fusible link in a PROM associated with the container if it is detected that sufficient fluid has been used.

An exemplary program for the display unit is shown in FIG. 17. After "power on" or "reset" events, initialization tasks 600, 603 and 604 are performed. Here, any internal registers, peripherals, etc. are properly initialized and, in the preferred embodiment all lamps are displayed for 4 seconds at task 604 so that the operator may make a check on the operability of the lamp display units. Thereafter, task 606 is entered which causes the transmission of the word then in the output register to the spray control unit. At 608, a test is made to see if the radar unit is connected. If not, then the appropriate pattern of display lights is activated at 610 and control is returned to task 612 at the top of FIG. 17 where a control word is received from the spray unit. A test is made at 614 to see if this is the last word in an intended sequence of such control words. If not, then another word is transmitted to the spray control unit at 606. If it is the last word in a sequence, then it is stored and proper action is taken at task 616. Thereafter, new data for transmission to the spray control unit is formatted into the proper output registers at task 618.

If a radar unit is connected to the unit, then after test 608, the output of the radar is read at task 620 and the average speed is calculated. A test is then made at 622 to see if the communication link is working. If it is, all available status information is displayed at 624, appropriate action is taken on any command buttons that may be pressed by the operator at 626 and appropriate action is taken at 628 on any internal time-outs that may have occurred. Appropriate speed limits are calculated at 630 and, if desired, control action may be taken if the actual speed of the vehicle is outside these limits (not shown in FIG. 17). If the communication link is not working, only the speed is displayed at task 632 before control is transferred back to the top of FIG. 17 where further attempts may be made to activate the communication link.

Numerous changes may be visualised in the exemplary embodiments of the invention illustrated and described in detail.

For example, the design of the microprocessor control system and the sequence of operations carried out. If desired, further automation and sophistication could be introduced. For example, the tractor could be provided with additional guidance means (e.g. radar), and (with suitable programming) it could then be possible to dispense with the services of a tractor driver.

The invention may also be fitted to other vehicles besides tractors, e.g. ground effect vehicles or aircraft.

Although the specific embodiments of the invention have been described with reference to the electrostatic spraying of agricultural chemicals it will be apparent to those skilled in the art that the sprayhead assemblies of the present invention can be adapted to the spraying of other fluids by non-electrostatic spraying techniques.

All variations or modifications of the exemplary embodiments which retain the novel and advantageous features of this invention as defined by the appended claims are an embodiment of this invention.

We claim:

1. A container comprising:
   a container body having an enclosed volume for retaining a predetermined substance; and
   at least one memory device uniquely and permanently associated with said container body and carrying machine readable information uniquely relating to the intended predetermined substance contents of the container;
   the memory device being operably connectable to operating means for operating upon said contents including means responsive to said information communicated from said memory device whereby a predetermined operation actively involving the intended contents of the container is performed in a manner at least partly determined by the characteristics of the intended contents.

2. A container comprising:
   a container body having an enclosed volume for retaining a predetermined intended contents; and
   at least one active memory device permanently affixed to said container body and carrying machine readable information uniquely relating to the intended contents of the container;
   the memory device being operably connectable to operating means for operating upon said contents including means responsive to information communicated from said active memory device whereby a predetermined operation involving the intended contents of the container may be performed in a manner at least partly determined by the characteristics of the intended contents.

3. A container as claimed in claim 1 or claim 2 in which the memory device comprises a digital memory device.

4. A container as claimed in claim 1 or claim 2 in which the memory device comprises an analog memory device.

5. A container as claimed in claim 4 in which the analog memory device is connectable to an analog digital converter whereby the machine readable information is converted into digital form.

6. A container as claimed in claim 1 in which the memory device is preset.

7. A container as claimed in claim 1 in which the memory device includes an electrical circuit and has electrical contacts for connecting the device to the operating means in use and in which the operating means is adapted to supply at least one electrical input to the operation, the said operation having at least one electrically responsive operating variable which is thereby regulated at a value or values at least partly determined by the characteristics of the intended contents of the container.

8. A container as claimed in claim 1 in which the memory device includes a programmable read-only memory device.

9. A container as claimed in claim 1 in which the memory device includes at least one fusible link.

10. A container as claimed in claim 1 in which the memory device includes at least one integrated circuit device.

11. A container as claimed in claim 1 in which the memory device is pre-set to cause the operating means to cease operation when the contents of the container in use reach a predetermined state.

12. A container as claimed in claim 11 in which the predetermined state is when the contents of the container are substantially exhausted.

13. A container as claimed in claim 1 in which the memory device is pre-set in such a way as to make alteration of the setting subsequent to original filling of the container difficult.

14. A container as claimed in claim 13 in which the memory device is at least partly non-resettable.

15. A container as claimed in claim 1 in which the memory device is pre-set with a security code which prevents use of unauthorised containers.

16. A container as claimed in claim 1 in which the memory device forms an integral part of the container.

17. A container as claimed in claim 1 in which the memory device is attached to a closure forming part of the container.

18. A container as claimed in claim 1 including a port for connecting the container to the operating means in use.

19. A container as claimed in claim 1 adapted to be detachably connectable to the operating means.

20. A container as claimed in claim 18 or 19 including coupling means for connecting the container to the operating means, the coupling means being formed so as automatically to make electrical connections between the memory device and the operating means and to open the port to connect the container and the operating means.

21. A container as claimed in claim 18 or 19 in which the port includes an orifice in a closure for the container.

22. A container as claimed in claim 20 in which the intended contents of the container are fluid.

23. A container as claimed in claim 22 which also includes an air entrance port for permitting entry of air into the container in use as fluid is drawn from the container said air entrance port including a check valve to prevent the passage of fluid therefrom when not desired.

24. A container as claimed in claim 23 in which the coupling means is also formed so as automatically to connect the air entrance port to the atmosphere when the container is mated with the coupling means.

25. A container as claimed in claim 23 in which the air entrance port forms part of a closure for the container.

26. A container as claimed in any one of claims 17 to 19 wherein said body includes an outlet port and closure means affixed thereto.

27. A container as claimed in claim 22 in which the operating means includes an electrically operated pumping means and in which the memory device is preset to control the rate at which the pumping means pumps fluid in use.

28. A container as claimed in claim 27 in which the pumping means is a metering pump.

29. A container as claimed in claim 22 in which the container is adapted to contain agricultural chemical in fluid form.

30. A container as claimed in claim 1 in which the operating means includes a dispensing means for the intended contents of the container wherein the rate at which the contents are dispensed in use is at least partly determined by the characteristics of the contents.

31. A container as claimed in claim 30 in which the dispensing means includes at least one sprayhead the said container being fluid connectable to the sprayhead in use.

32. A container as claimed in claim 31 in which the operating means includes means for electrostatically charging the spray produced by the sprayhead.

33. A container as claimed in claim 32 in which the sprayhead itself is electrostatically chargeable.

34. A container as claimed in claim 33 in which the memory is pre-set to determine the electrical potential of the sprayhead and is electrically connectable to the sprayhead.

35. A container as claimed in claim 34 in which the sprayhead has a field-intensifying electrode adjacent to it, the electrode being earthed or at a comparitively low potential.

36. A fluid dispensing system comprising a plurality of interconnected containers as claimed in claim 30 and including means whereby a plurality of fluids are dispensable, in use, in a ratio at least partly predetermined by the memory devices attached to the containers.

37. A fluid dispensing system as claimed in claim 36 having at least one additional container adapted for dispensing a diluent or flushing fluid in use, the said container being fluid connectable to a common outlet(s) of the container(s) in use.

38. A fluid dispensing system as claimed in claim 36 or claim 37 having additional means for gas purging the diluent or flushing fluid from the system after use.

39. A fluid dispensing system as claimed in anyone of claims 36 to 37 in which at least one of the containers has attached to its a memory device which is pre-set to prevent the dispensing of undesirable mixtures of fluids.

40. A container as claimed in claim 1 in which the operating means includes at least one electronic data processing circuit and the memory device includes an electrical memory device which is electrically connectable with the electronic data processing circuit in use in order to regulate the operating involving the intended contents of the container.

41. A container as claimed in claim 1 in combination with a fluid detecting device located in an outlet from the container.

42. A container as claimed in claim 1 at least partially filled with the said contents.

43. Operating means suitable for use with a container as claimed in claim 1 arranged to be actuated only when the information carried by the memory device of the container includes a security code.

44. A container as claimed in claim 1 which is adapted to be mounted on a vehicle.

45. A fluid dispensing system comprising:
a container for dispensing fluid;
a dispensing means having at least one electrically-responsive operating variable in fluid connection with the container, and
an active memory device carrying machine readable information relating to the fluid, permanently attached to the container and electrically connected to the dispensing means and being electrically connectable to an electrical power source, the memory device being pre-set to determine at least one electrical input to the dispensing means in order to regulate the electrically responsive operating variable in use at a value or values at least partly determined by the characteristics of the fluid to be dispensed.

46. A complex for spraying agricultural chemicals from a vehicle comprising:
a fluid dispensing system including
a container for dispensing fluid;
a dispensing means having at least one electrically-responsive operating variable in fluid connection with the container, and
an active memory device carrying machine readable information relating to the fluid, attached to the container and electrically connected to the dispensing means and being electrically connectable to an electrical power source, the memory device being pre-set to determine at least one electrical input to the dispensing means in order to regulate the electrically responsive operating variable in use at a value or values at least partly determined by the characteristics of the fluid to be dispensed;
said system being adapted to be mounted on a vehicle in which the dispensing means includes an electrically operated pumping means and at least one sprayhead in fluid connection with the pumping means and at least one electronic data processing circuit connected to the memory device and adapted to regulate the operation of the pumping means according to the pre-setting of the said memory device.

47. A complex as described in claim 46 in which the sprayhead is electrically chargeable so as to produce a spray of electrostatically charged particles of fluid in use and is electrically connected to the memory device and/or the electronic data processing circuit whereby the electrical potential of the sprayhead is determined by the pre-setting of the memory device.

48. A complex as described in claim 46 or claim 47 and including an electrical circuit device forming a part of the sprayhead assembly and electrically connected to the memory device of the container and/or the electronic data processing circuit so as to monitor and/or control at least one electrically sensitive operating variable of the sprayhead.

49. A complex as claimed in any one of claims 46 to 47 in which the vehicle is provided with speed measuring means adapted to provide electrical signals representative of the speed of the vehicle relative to the ground and in which the electronic data processing circuit is adapted to receive such signals in addition to the input from the memory device so as to adjust the operation of the pumping means in order to maintain a desired spray application rate at various vehicle speeds.

50. A complex as claimed in claim 49 in which the speed measuring means is a radar apparatus.

51. A fluid container having a hollow body for containing a predetermined contents, and having permanently attached to it at least one electrical active memory device pre-set in a unique way relating to the predetermined intended contents of the container, the device being electrically connectable to a dispensing means for the contents and to an electrical power source in which the memory device is adapted to cauwe the dispensing means to cease dispensing of the contents when the container is substantially exhausted to prevent further dispensing of fluid from the container.

52. A process for performing an operation actively involving the predetermined contents of a container, said process comprising the steps of:
permanently attaching to the container a memory device carrying machine readable information relating to the said contents;
communicating the said information to a response means responsive to the information; and
operating upon the contents so that at least one operational variable is at least partly determined by the response of the said response means to the information.

53. A process as claimed in claim 52 in which said operational variable is automatically regulated at a value or values at least partly determined by the characteristics of the predetermined contents of the container.

54. A container having a hollow body and having permanently associated with it at least one active memory device carrying machine readable information relating to the predetermined intended contents of the container; the container being operably connectable to operating means whereby an operation involving the contents of the container may be performed, and said memory device being operably connectable to said operating means which is responsive to information communicated from said memory device.

* * * * *